(12) United States Patent
Sumioka et al.

(10) Patent No.: US 8,295,870 B2
(45) Date of Patent: Oct. 23, 2012

(54) COMMUNICATION SYSTEM, CALL CONTROL DEVICE, BASE STATION DEVICE AND RECORDING MEDIUM

(75) Inventors: Motoshi Sumioka, Kawasaki (JP); Ryuichi Matsukura, Kawasaki (JP); Shingo Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 256 days.

(21) Appl. No.: 12/698,649

(22) Filed: Feb. 2, 2010

(65) Prior Publication Data
US 2010/0135270 A1    Jun. 3, 2010

Related U.S. Application Data

(63) Continuation of application No. PCT/JP2007/065518, filed on Aug. 8, 2007.

(51) Int. Cl.
| | |
|---|---|
| H04B 7/00 | (2006.01) |
| H04M 3/42 | (2006.01) |
| G06F 15/173 | (2006.01) |
| G06F 15/16 | (2006.01) |
| H04L 12/26 | (2006.01) |
| H04L 12/28 | (2006.01) |

(52) U.S. Cl. ........ 455/519; 455/416; 709/224; 709/226; 709/233; 709/238; 370/351; 370/229; 370/395.21

(58) Field of Classification Search .......... 455/461–464, 455/518–521
See application file for complete search history.

(56) References Cited

U.S. PATENT DOCUMENTS

| | | | | |
|---|---|---|---|---|
| 5,610,918 A | * | 3/1997 | Kamo et al. | 370/395.5 |
| 6,546,012 B2 | * | 4/2003 | Kamo et al. | 370/395.1 |
| 6,760,774 B1 | * | 7/2004 | Soumiya et al. | 709/233 |
| 7,240,099 B2 | * | 7/2007 | Miyazaki et al. | 709/213 |
| 7,269,423 B2 | * | 9/2007 | Lee et al. | 455/452.1 |
| 7,389,533 B2 | * | 6/2008 | Bartlett et al. | 726/15 |
| 7,440,761 B2 | * | 10/2008 | Matsukura et al. | 455/452.2 |
| 7,454,480 B2 | * | 11/2008 | Labio et al. | 709/217 |
| 7,685,311 B2 | * | 3/2010 | Friedman et al. | 709/245 |

(Continued)

FOREIGN PATENT DOCUMENTS

JP    B 2572193    1/1997

(Continued)

OTHER PUBLICATIONS

Japanese Office Action issued in corresponding Japanese Application No. 2009-526294, mailed May 24, 2011.

*Primary Examiner* — Matthew Sams
(74) *Attorney, Agent, or Firm* — Greer, Burns & Crain, Ltd.

(57) ABSTRACT

A communication system for calling a plurality of terminal devices in response to a single request of call connection, assigning, for a single terminal device which answered the call, a communication band to be occupied in a communication band which can be used, and establishing the call connection in the assigned communication band, the communication system includes a deriving section that derives a communication band required for the call connection of each of the terminal devices to be called when the request of call connection is received, a securing section that secures a communication band including the maximum width in each of the derived communication bands in the communication band which can be used; and an assigning section that assigns a communication band to be occupied in the secured communication band to the terminal device which answered the call.

14 Claims, 38 Drawing Sheets

U.S. PATENT DOCUMENTS

| | | | |
|---|---|---|---|
| 7,693,741 B2* | 4/2010 | Tischer et al. | 705/7.11 |
| 7,702,280 B2* | 4/2010 | Takeda et al. | 455/7 |
| 7,751,439 B2* | 7/2010 | El Kolli et al. | 370/468 |
| 7,860,968 B2* | 12/2010 | Bornhoevd et al. | 709/224 |
| 7,894,367 B2* | 2/2011 | Lin et al. | 370/252 |
| 8,004,978 B2* | 8/2011 | Brandt et al. | 370/230 |
| 8,014,381 B2* | 9/2011 | Kumai et al. | 370/351 |
| 8,060,606 B2* | 11/2011 | Friedman et al. | 709/224 |
| 2002/0061742 A1* | 5/2002 | Lapaille et al. | 455/414 |
| 2002/0161755 A1* | 10/2002 | Moriarty | 707/4 |
| 2002/0174227 A1* | 11/2002 | Hartsell et al. | 709/226 |
| 2003/0110293 A1* | 6/2003 | Friedman et al. | 709/245 |
| 2004/0167981 A1* | 8/2004 | Douglas et al. | 709/225 |
| 2004/0242219 A1* | 12/2004 | Oie et al. | 455/422.1 |
| 2005/0047364 A1 | 3/2005 | Matsukura et al. | |
| 2005/0114156 A1* | 5/2005 | Hodges et al. | 705/1 |
| 2006/0120312 A1* | 6/2006 | Yamauchi et al. | 370/310 |
| 2006/0146764 A1 | 7/2006 | Takemoto et al. | |
| 2007/0263818 A1 | 11/2007 | Sumioka et al. | |
| 2009/0175191 A1* | 7/2009 | Lin et al. | 370/253 |
| 2010/0128626 A1* | 5/2010 | Anderson et al. | 370/252 |
| 2010/0135270 A1* | 6/2010 | Sumioka et al. | 370/338 |

FOREIGN PATENT DOCUMENTS

| | | |
|---|---|---|
| JP | B 2859210 | 2/1999 |
| JP | 2001-111599 | 4/2001 |
| JP | A 2005-80157 | 3/2005 |
| JP | A 2006-191523 | 7/2006 |
| JP | 2007110411 A * | 4/2007 |
| JP | A 2007-110411 | 4/2007 |
| JP | A 2007-274577 | 10/2007 |
| WO | WO 2004/047376 A1 | 6/2004 |

* cited by examiner

FIG. 4

| INCOMING CALL NUMBER | CALL NUMBER 1 | CALL NUMBER 2 | CALL NUMBER 3 |
|---|---|---|---|
| 6001 | 6001 | 6011 | 6012 |
| 6002 | 6001 | 6011 | 6012 |
| | | | |

FIG. 5

| TELEPHONE NUMBER | IP ADDRESS |
|---|---|
| 6001 | 192.168.1.55 |
| 6011 | 192.168.1.101 |
| 6012 | 192.168.1.102 |

FIG. 6

| IP ADDRESS (TERMINAL DEVICE) | IP ADDRESS (BASE STATION DEVICE) |
|---|---|
| 192.168.1.55 | 192.168.1.1 |
| 192.168.1.101 | 192.168.1.1 |
| 192.168.1.102 | 192.168.1.1 |
| | |

FIG. 7

| IP ADDRESS or GROUP ID | BAND OCCUPYING RATE |
|---|---|
| 192.168.1.50 | 45.0% |
| 192.168.1.74 | 45.0% |
| 6001 | 9.3% |
| | |

FIG. 8

| GROUP ID | IP ADDRESS | BAND OCCUPYING RATE | CONNECTION PROPRIETY FLAG |
|---|---|---|---|
| 6001 | 192.168.1.55 | 7.4% | 1 |
| 6001 | 192.168.1.101 | 9.3% | 1 |
| 6001 | 192.168.1.102 | 15.6% | 0 |
| | | | |

FIG. 11

| IP ADDRESS | REQUEST TYPE | GROUP ID |
|---|---|---|
| 192.168.1.55 | AUDIO BAND SECURING | 6001 |
| 192.168.1.101 | AUDIO BAND SECURING | 6001 |
| 192.168.1.102 | AUDIO BAND SECURING | 6001 |
|  |  |  |

FIG. 12

| IP ADDRESS | WIRESS COMMUNICATION SPEED | BAND OCCUPYING RATE |
|---|---|---|
| 192.168.1.55 | 11 Mbps | 7.4 % |
| 192.168.1.101 | 5.5 Mbps | 9.3 % |
| 192.168.1.102 | 2 Mbps | 15.6 % |
|  |  |  |

FIG. 13

| IP ADDRESS | CALL PROPRIETY |
|---|---|
| 192.168.1.55 | CALLABLE |
| 192.168.1.101 | CALLABLE |
| 192.168.1.102 | NOT CALLABLE |
| | |

FIG. 15

| IP ADDRESS (TERMINAL DEVICE) | IP ADDRESS (BASE STATION DEVICE) |
|---|---|
| 192.168.1.100 | 192.168.1.1 |
| 192.168.1.101 | 192.168.1.1 |
| 192.168.1.102 | 192.168.1.1 |
| 192.168.2.85 | 192.168.2.1 |
| 192.168.2.86 | 192.168.2.1 |
| 192.168.2.87 | 192.168.2.1 |
| | |

FIG. 17

| IP ADDRESS (BASE STATION DEVICE) | IP ADDRESS (TERMINAL DEVICE) or GROUP ID | BAND OCCUPYING RATE |
|---|---|---|
| 192.168.1.1 | 192.168.1.50 | 45.0 % |
| 192.168.1.1 | 192.168.1.74 | 45.0 % |
| 192.168.1.1 | 6001 | 9.3 % |
| | | |
| 192.168.2.1 | 192.168.2.85 | 7.4 % |
| | | |

FIG. 18

| IP ADDRESS (BASE STATION DEVICE) | GROUP ID | IP ADDRESS (TERMINAL DEVICE) | BAND OCCUPYING RATE | CONNECTION PROPRIETY FLAG |
|---|---|---|---|---|
| 192.168.1.1 | 6001 | 192.168.1.55 | 7.4 % | 1 |
| 192.168.1.1 | 6001 | 192.168.1.101 | 9.3 % | 1 |
| 192.168.1.1 | 6001 | 192.168.1.102 | 15.6 % | 0 |

FIG. 24

| NUMBER | CODEC | TYPE INFORMATION | WIRED COMMUNICATION BAND (ONE WAY) |
|---|---|---|---|
| 0 | PCMU | Audio | 64kbps |
| 1 | Reserved | | 64kbps |
| 2 | Reserved | | 64kbps |
| 3 | GSM | Audio | 53kbps |
| 4 | G723 | Audio | 6kbps |
| 8 | PCMA | Audio | 6kbps |
| 18 | G729 | Audio | 8kbps |
| 26 | JPEG | Video | 320Kbps (variable) |
| 34 | H.263 | Video | 33.6kbps (variable) |

FIG. 26

| IP ADDRESS | REQUEST TYPE | GROUP ID | WIRED CONNECTION BAND |
|---|---|---|---|
| 192.168.1.100 | AUDIO BAND SECURING | 6001 | 128 kbps |
| 192.168.1.101 | AUDIO BAND SECURING | 6001 | 128 kbps |
| 192.168.1.102 | AUDIO BAND SECURING | 6001 | 128 kbps |

FIG. 28

| IP ADDRESS | COMMUNICATION TYPE |
|---|---|
| 192.168.1.100 | AUDIO |
| 192.168.1.101 | VIDEO |
| 192.168.1.102 | AUDIO, VIDEO |
| | |

FIG. 30

| IP ADDRESS | REQUEST TYPE | GROUP ID | WIRED CONNECTION BAND |
|---|---|---|---|
| 192.168.1.100 | AUDIO BAND SECURING | 6001 | 128 kbps |
| 192.168.1.101 | VIDEO BAND SECURING | 6001 | 640 kbps |
| 192.168.1.102 | AUDIO AND VIDEO BAND SECURING | 6001 | 768 kbps |

FIG. 31

| GROUP ID | IP ADDRESS | WIRED COMMUNICATION BAND | BAND OCCUPYING RATE | CONNECTION PROPRIETY FLAG |
|---|---|---|---|---|
| 6001 | 192.168.1.100 | 128 kbps | 7.4 % | 1 |
| 6001 | | 16 kbps | 5.2 % | 1 |
| 6001 | 192.168.1.101 | 128 kbps | 9.3 % | 1 |
| | | 16 kbps | 5.4 % | 1 |
| 6001 | 192.168.1.102 | 128 kbps | 15.6 % | 0 |
| | | 16 kbps | 6.0 % | 1 |

FIG. 34

| IP ADDRESS | REQUEST TYPE | GROUP ID | WIRED CONNECTION BAND |
|---|---|---|---|
| 192.168.1.100 | AUDIO BAND SECURING | 6001 | 128 kbps, 16kbps |
| 192.168.1.101 | AUDIO BAND SECURING | 6001 | 128 kbps, 16kbps |
| 192.168.1.102 | AUDIO BAND SECURING | 6001 | 128 kbps, 16kbps |
| | | | |

FIG. 35

| IP ADDRESS | WIRED COMMUNICATION BAND | CALL PROPRIETY |
|---|---|---|
| 192.168.1.100 | 128 kbps | CALLABLE |
| | 16 kbps | CALLABLE |
| 192.168.1.102 | 128 kbps | CALLABLE |
| | 16 kbps | CALLABLE |
| 192.168.1.101 | 128 kbps | NOT CALLABLE |
| | 16 kbps | CALLABLE |
| | | |

FIG. 38

| IP ADDRESS | CALL PROPRIETY |
|---|---|
| 192.168.1.100 | CALLABLE |
| 192.168.1.101 | CALLABLE |
| 192.168.1.102 | EXCLUDE CANDIDATE |
| | |

COMMUNICATION SYSTEM, CALL CONTROL DEVICE, BASE STATION DEVICE AND RECORDING MEDIUM

CROSS-REFERENCE TO RELATED APPLICATIONS

This application is continuation, filed under 35 U.S.C. §111(a), of PCT International Application No. PCT/JP2007/065518 which has an international filing date of Aug. 8, 2007, and designated the United States of America.

FIELD

The present application relates to a communication system for calling a plurality of terminal devices in response to a single request of call connection, assigning a communication band to be occupied in a communication band which can be used to a single terminal device which answered the call, and establishing the call connection in the assigned communication band, and relates to a call control device and a base station device that are used in the communication system, and a computer program for realizing the call control device and the base station device. More specifically, the present application relates to the communication system, the call control device, the base station device, and the computer program for optimizing the communication band after establishing the call connection.

BACKGROUND

Wireless IP phones have started to be used under various environments, such as corporations and private houses, utilizing platforms promoted according to the popularization of wireless LAN of these days. In a communication system using the wireless IP phones which have started to spread in corporations, there is a system having a group incoming call function for calling a plurality of terminal devices in response to a single request of call connection, and assigning a required communication band to a single terminal device which answered the call to establish call connection.

In Japanese Patent No. 2859210, a communication system having a group incoming call function for assigning one of telephone call channels of a base station to carry out a broadcast call to a plurality of wireless mobile stations is proposed.

However, the conventional communication system described in Japanese Patent No. 2859210 has a problem in which it carries out band securing for assigning a predetermined communication band set in advance for the request of call connection, and after establishing the call connection, it carries out a telephone call by establishing the call connection in the reserved communication band, and therefore, the assigned communication band is not always appropriate. Because a communication situation changes in the wireless IP phone according to the communication environment between the terminal device and the base station device used as an access point, not all of the communication situation of the plurality of terminal devices to be targets of the group incoming call are the same. For example, if a communication environment is bad and call connection is established for a terminal device which requires a communication band wider than a communication band set in advance, situations, such as communication quality deterioration, audio quality degradation, and abnormal cutting of the call connection, occur. On the other hand, for example, if a communication environment is good and call connection is established for a terminal device which can communicate in a communication band narrower than the communication band set in advance, the communication efficiency as the whole system gets worse because the communication band is occupied more than needed.

SUMMARY

A communication system according a first aspect of the present application for calling a plurality of terminal devices in response to a single request of call connection, assigning, for a single terminal device which answered the call, a communication band to be occupied in a communication band which can be used, and establishing the call connection in the assigned communication band, includes, when the request of call connection is received, a deriving section that derives a communication band required for the call connection of each of the terminal devices to be called, a securing section that secures a communication band having the maximum width in each of the derived communication bands in the communication band which can be used, and an assigning section that assigns a communication band to be occupied in the secured communication band to the terminal device which answered the call.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram conceptually illustrating an example of recorded contents of a group table with which a call control device according to Embodiment 1 of the present application is provided.

FIG. 5 is a diagram conceptually illustrating an example of recorded contents of a specifying information table with which the call control device according to Embodiment 1 of the present application is provided.

FIG. 6 is a diagram conceptually illustrating an example of recorded contents of an attribute table with which the call control device according to Embodiment 1 of the present application is provided.

FIG. 7 is a diagram conceptually illustrating an example of recorded contents of a use band administrative table with which a base station device according to Embodiment 1 of the present application is provided.

FIG. 8 is a diagram conceptually illustrating an example of recorded contents of a requested band administrative table with which the base station device according to Embodiment 1 of the present application is provided.

FIG. 11 is a diagram conceptually illustrating an example of information included in a band securing request transmitted from the call control device according to Embodiment 1 of the present application.

FIG. 12 is a diagram conceptually illustrating an example of IP addresses, wireless communication speeds, and band occupying rates that the base station device according to Embodiment 1 of the present application records.

FIG. 13 is a diagram conceptually illustrating an example of information included in a resulted response transmitted from the base station device according to Embodiment 1 of the present application.

FIG. 15 is a diagram showing an example of recorded contents of an attribute table with which a call control device according to Embodiment 2 of the present application is provided.

FIG. 17 is a diagram conceptually illustrating an example of recorded contents of a use band administrative table with which a call control device according to Embodiment 3 of the present application is provided.

FIG. 18 is a diagram conceptually illustrating an example of recorded contents of a requested band administrative table with which the call control device according to Embodiment 3 of the present application is provided.

FIG. 24 is a diagram conceptually illustrating an example of recorded contents of a connection form table with which a call control device according to Embodiment 5 of the present application is provided.

FIG. 26 is a diagram conceptually illustrating an example of information included in a band securing request transmitted from the call control device according to Embodiment 5 of the present application.

FIG. 28 is a diagram conceptually illustrating an example of recorded contents of a type table with which a call control device according to Embodiment 6 of the present application is provided.

FIG. 30 is a diagram conceptually illustrating an example of information included in a band securing request transmitted from the call control device according to Embodiment 6 of the present application.

FIG. 31 is a diagram conceptually illustrating an example of a requested band administrative table with which a base station device according to Embodiment 7 of the present application is provided.

FIG. 34 is a diagram conceptually illustrating an example of information included in a band securing request transmitted from the call control device according to Embodiment 7 of the present application.

FIG. 35 is a diagram conceptually illustrating an example of information included in a resulted response transmitted from a base station device according to Embodiment 8 of the present application.

FIG. 38 is a diagram conceptually illustrating an example of information included in a resulted response transmitted from the base station device according to Embodiment 8 of the present application.

DESCRIPTION OF EMBODIMENTS

Hereafter, the present application is described in full detail based on the drawings in which embodiments of the present application are illustrated.

Embodiment 1

Figure 1:
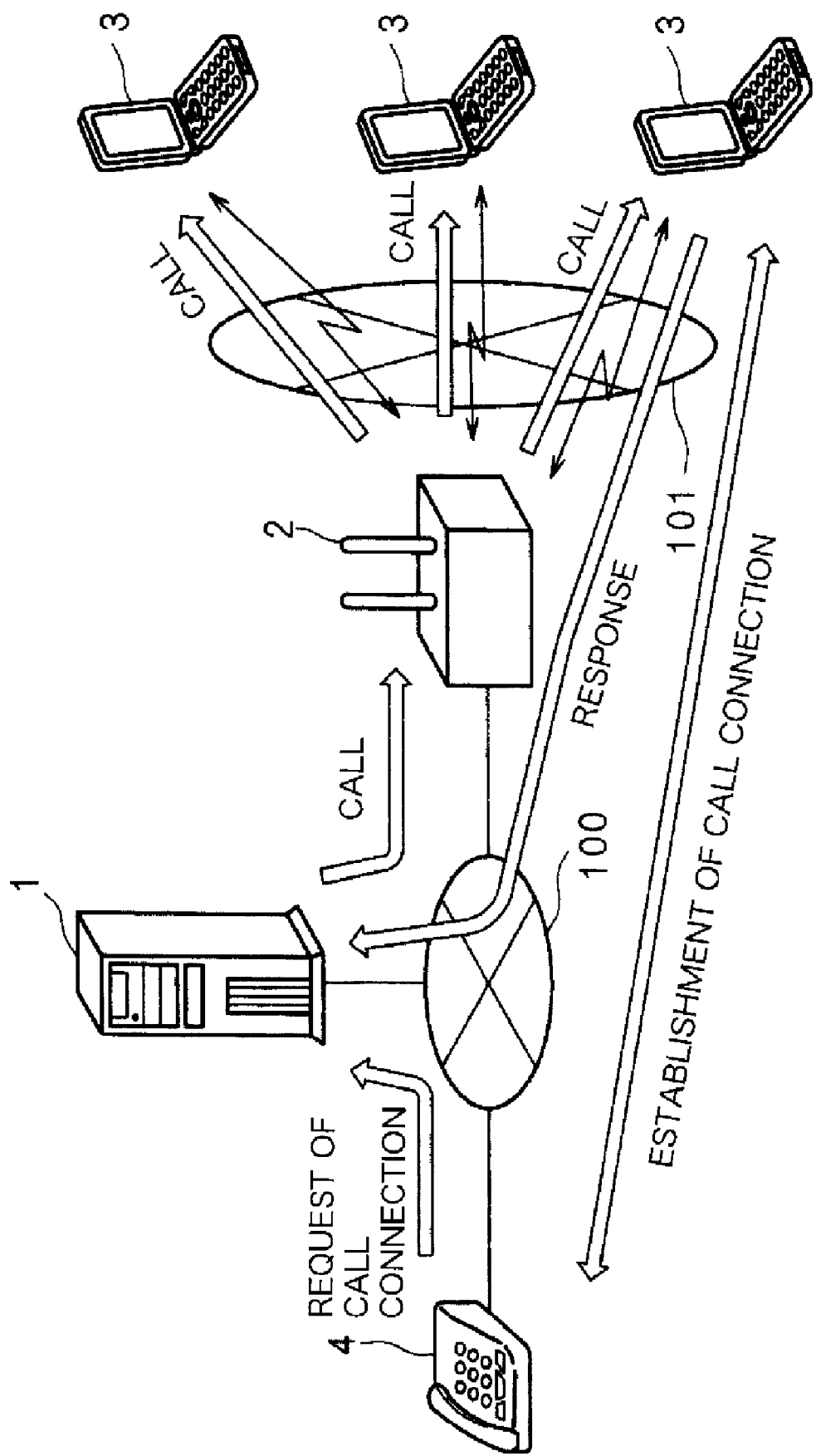
FIG. 1 is a diagram conceptually illustrating a configuration example of a communication system according to Embodiment 1 of the present application.

FIG. 1 is a diagram conceptually illustrating a configuration example of a communication system according to Embodiment 1 of the present application. "1" in FIG. 1 is a call control device of the present application using an SIP (Session Initiation Protocol) server computer that carries out various controls according to a call. The call control device 1 is connected with a wired communication network 100, such as the Internet, a dedicated IP network, a WAN, a LAN, and is connected with a base station device 2 that uses a computer for communication, such as an access point, via the wired communication network 100. Note that, although described herein as the wired communication network 100, it may include a wireless communication section in its part. The base station device 2 can communicate with a plurality of terminal devices 3, 3, ..., such as wireless IP phones, via a wireless communication network 101, such as a wireless LAN. When a request of call connection is received for the terminal devices 3, 3, ... from other telephones 4, such as fixed-line type IP phones, a wireless IP phones, based on control of the call control device 1, call connection is established between the telephone 4 and the terminal device 3, and IP phone communication for transmitting and receiving streaming data which reproduces video and/or audio is carried out. Note that the plurality of terminal devices 3, 3, ... are partially or entirely grouped in advance, and the call control device 1 has a group incoming call function for calling the plurality of terminal devices 3, 3, ... which are grouped in response to a single request of call connection, and establishing call connection to a single terminal device 3 answered the call.

Figure 2:
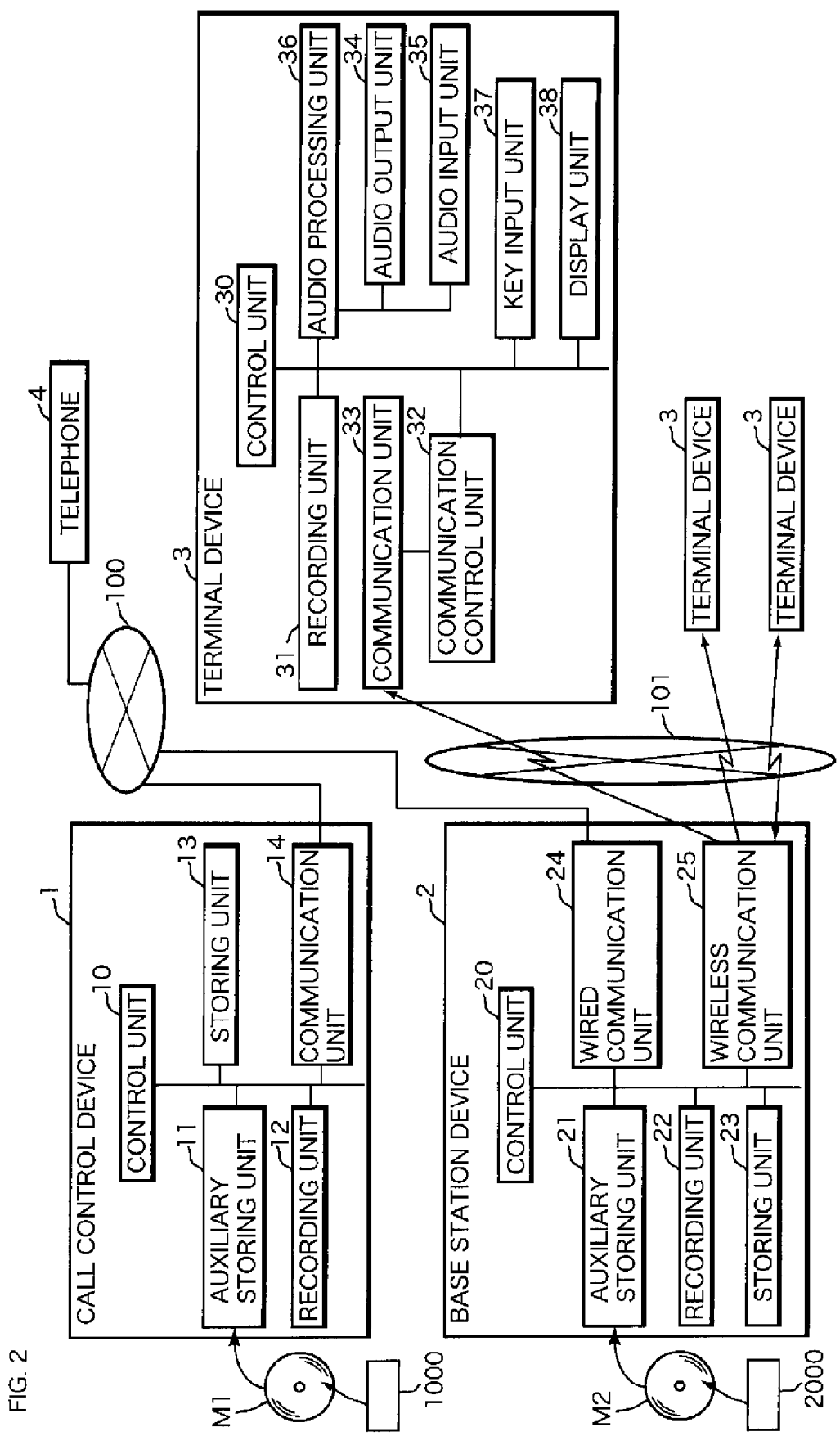
FIG. 2 is a block diagram showing a configuration example of hardware of each device with which the communication system according to Embodiment 1 of the present application is provided.

FIG. 2 is a block diagram showing a configuration example of hardware of each device with which the communication system according to Embodiment 1 of the present application is provided. The call control device 1 includes a control unit 10, such as a CPU, for controlling the entire device, an auxiliary storing unit 11, such as a CD-ROM drive, for reading a variety of information in a recording medium M1, such as a CD-ROM, which stores a variety of information, such as a computer program 1000 and data for the call control device of the present application, a recording unit 12, such as a hard disk drive, for recording a variety of information read by the auxiliary storing unit 11, and a storing unit 13, such as a RAM, for storing information temporarily. By reading the variety of information of data and the computer program 1000 for the call control device of the present application from the recording unit 12, storing the information in the storing unit 13, and performing various procedures included in the computer program 1000 by the control unit 10, the SIP server computer operates as the call control device 1 of the present application. The call control device 1 also includes a communication unit 14 to be connected with the wired communication network 100.

A base station device 2 includes a control unit 20, such as a CPU, for controlling the entire device, an auxiliary storing unit 21, such as a CD-ROM drive, for reading a variety of information from a recording medium M2, such as a CD-ROM, which stores a variety of information, such as a computer program 2000 and data for the base station device of the present application, a recording unit 22, such as a hard disk drive, for recording the read variety of information, and a storing unit 23, such as a RAM, for storing information temporarily. By reading the variety of information, such as the computer program 2000 and data for the base station device of the present application from the recording unit 22, storing the information in the storing unit 23, and performing various procedures included in the computer program 2000 by the control unit 20, the computer for communication operates as the base station device 2 of the present application. The base station device 2 also includes a wired communication unit 24 to be connected with the wired communication network 100, and a wireless communication unit 25 to be connected with the terminal devices 3, 3, ... via the wireless communication network 101.

In FIG. 2, a configuration in which a portable IP phone is used as the terminal device 3 is illustrated. The terminal device 3 includes a control unit 30 for controlling the entire device, and a recording unit 31, such as a ROM and a RAM, for storing information, such as a computer program and data required for various processing. The control unit 30 also controls a communication control unit 32 for controlling communication, and the communication control unit 32 controls a communication unit 33, such as an antenna and its associated circuit for transmitting and receiving data, such as a digital signal, required for telephonic communications. The control unit 30 also controls an audio processing unit 36 for performing conversion processes of analog audio signals outputted from an audio output unit 34, such as a speaker, and analog audio signals inputted from an audio input unit 35, such as a microphone. The conversion processes performed by the audio processing unit 36 are processing for converting a digital signal into an analog audio signal to output it from the audio output unit 34, and processing for converting an analog audio signal into a digital signal based on the audio inputted from the audio input unit 35. Further, by the control of the control unit 30, the terminal device 3 receives an input from a key input unit 37, such as a push button, for receiving a keystroke, such as alphanumeric character(s) and various command(s), and causes a display unit 38, such as a liquid crystal display, for displaying a variety of information, such as a television image based on the inputted information by the keystroke(s) and the streaming data, to display required information.

Figure 3:
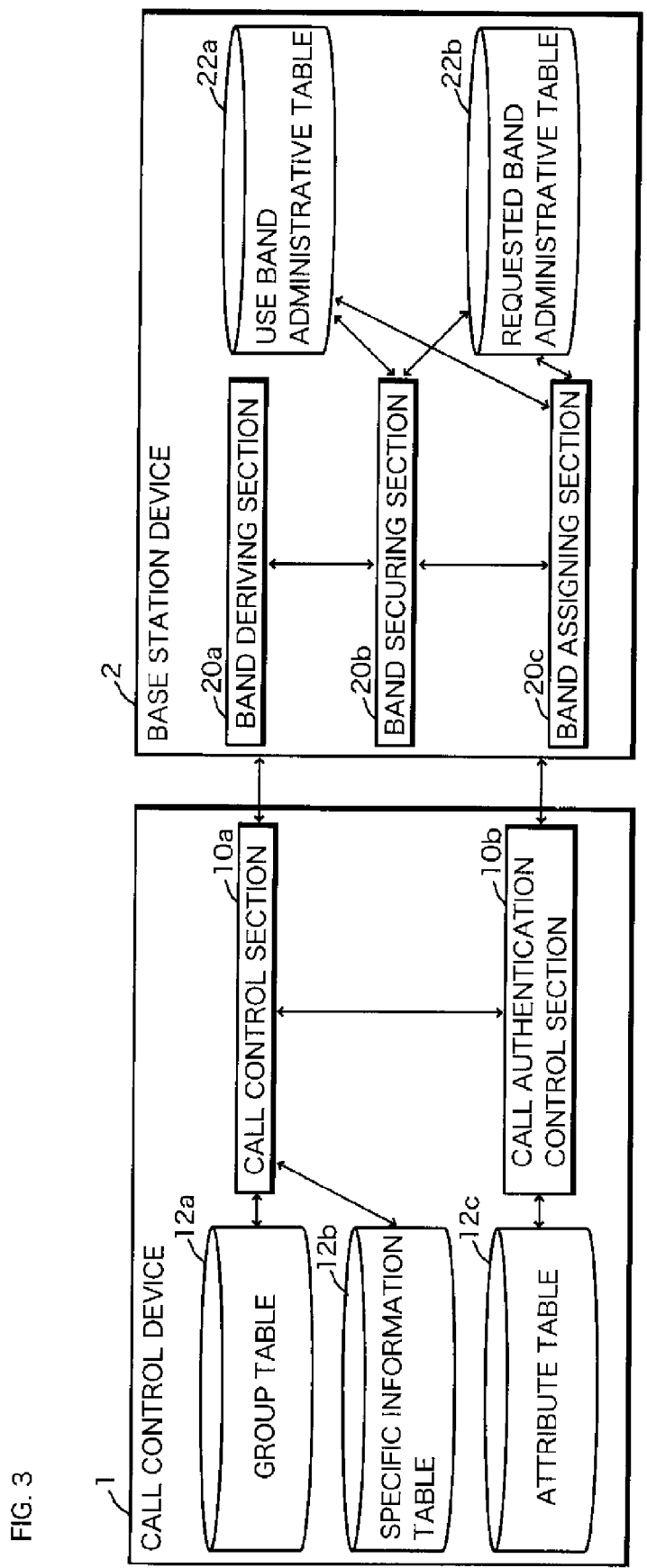
FIG. 3 is a functional block diagram showing an example of a function of each device with which the communication system according to Embodiment 1 of the present application is provided.

FIG. 3 is a functional block diagram showing an example of a function of each device with which the communication system according to Embodiment 1 of the present application is provided. The call control device 1 of the present application causes the control unit 10 to execute the various computer programs according to a call control of the computer program 1000 or the like for the call control device of the present application to function the control unit 10 as various program modules for a call control section 10a for controlling the entire call, a call authentication control section (CAC: Call Admission Control) 10b for performing control for the group incoming call function according to the call. By the control unit 10 executing the various computer programs according to the call control of the computer program 1000 or the like for the call control device of the present application, it generates, in a recording area of the recording unit 12, various tables, such as a group table 12a for recording group(s) of the terminal devices 3, 3, ..., a specifying information table 12b for recording specifying information, such as IP addresses, for specifying the terminal devices 3, 3, ..., and an attribute table 12c for recording so as to associate the terminal devices 3, 3, ... and the base station device 2 to be an access point. Note that the various tables, such as the group table 12a, the specifying information table 12b, and the attribute table 12c, may be generated in a storing area of the storing unit 13, and may be generated in a storing area of other devices to be connected with the call control device 1.

By the control unit 20 executing the various computer programs of the computer program 2000 or the like for the base station device of the present application, the base station device 2 of the present application causes the control unit 20 to function as various program modules for a band deriving section 20a for deriving a communication band required for each call connection of each of the terminal devices 3, 3, . . . , a band securing section 20b for securing a communication band for the group incoming call, and a band assigning section 20c for assigning the communication band to a terminal device 3 which establishes call connection. Further, by the control unit 20 executing the various computer programs of the computer program 2000 or the like for the base station device of the present application, it generates in a recording area of the recording unit 22, various tables, such as a use band administrative table 22a for recording use condition(s) of the communication band, and a requested band administrative table 22b for recording the communication band required for the call connection of each of the terminal devices 3, 3, . . . derived by the band deriving section 20a. Note that the various tables, such as the use band administrative table 22a and the requested band administrative table 22b may be generated in a storing area of the storing unit 23.

FIG. 4 is a diagram conceptually illustrating an example of recorded contents of the group table 12a with which the call control device 1 according to Embodiment 1 of the present application is provided. In the group table 12a, call numbers indicative of a plurality of call targets are recorded per record so as to be associated with an incoming call number. As for both of the incoming call number and the call numbers, information, such as telephone numbers to call the terminal devices 3, 3, . . . are used, and for a request of call connection based on the incoming call number, the terminal devices 3, 3, . . . to which the plurality of call numbers correspond are called. For example, by the record of the first line of the group table 12a illustrated in FIG. 4, when the request of call connection based on a telephone number "6001" is received, a call to the respective terminal devices 3, 3, . . . to which telephone numbers "6001," "6011," or "6012" are assigned is carried out. Note that the telephone number stored in the group table 12a as the incoming call number is used as a group ID for identifying a group.

FIG. 5 is a diagram conceptually illustrating an example of stored contents of the specifying information table 12b with which the call control device 1 according to Embodiment 1 of the present application is provided. In the specifying information table 12b, information formed by associating a telephone number with an IP address of each of the terminal device 3, 3, . . . is stored per record. For example, by the record of the first line of the specifying information table 12b illustrated in FIG. 5, an IP address of "192.168.1.55" as specifying information for specifying a position on the wireless communication network 101 or the wired communication network 100 is assigned to the terminal device 3 whose telephone number is "6001." Note that, as the specifying information on the terminal device 3 herein, although the form in which the IP address is used is illustrated, if it is possible to specify the terminal device 3, information, such as a MAC address, a name for identification set suitably can be used as the specifying information.

FIG. 6 is a diagram conceptually illustrating an example of stored contents of the attribute table 12c with which the call control device 1 according to Embodiment 1 of the present application is provided. In the attribute table 12c, an attribute relation between the terminal devices 3, 3, . . . and the base station device 2 to be an access point is stored as a record associated with IP addresses. For example, by the record of the first line of the attribute table 12c illustrated in FIG. 6, the terminal device 3 whose IP address is "192.168.1.55" is connected with the wireless communication network 101 where the base station device 2 whose IP address is "192.168.1.1," is the access point. The IP address of the base station device 2 is the specifying information, such as a global IP address or a private IP address to locate the position of the base station device 2 on the wireless communication network 101 or the wired communication network 100. Note that, although an example is illustrated herein using an IP address (especially, a private IP address) as the specifying information of the base station device 2, if it is possible to specify the base station device 2, information, such as a MAC address, a name for identification set suitably, can be used as the specifying information.

FIG. 7 is a diagram conceptually illustrating an example of stored contents of the use band administrative table 22a with which the base station device 2 according to Embodiment 1 of the present application is provided. The use band administrative table 22a stores information indicative of the terminal device(s) 3 or its group that is using or securing the use of a communication band for communication, such as the call connection, and a band occupying rate indicative of the communication band that is being used or secured for the use so that they are associated with each other as a record. The information indicative of the terminal device(s) 3 or its group is an IP address of the terminal device 3 when the single terminal device 3 is using or securing the communication band, and it is a group ID indicated by an incoming call number when a communication band to be used after establishing the call connection is secured as a group incoming call function. Note that even if a group incoming call is made, when call connection is established, the IP address of the single terminal device 3 which established the call connection is stored in the use band administrative table 22a. For example, the record of the first line of the use band administrative table 22a illustrated in FIG. 7 shows a state in which the terminal device 3 whose IP address is "192.168.1.50," is using or securing a communication band where the band occupying rate becomes 45.0%. Further, the record of the third line shows a state in which a plurality of terminal devices 3, 3, . . . grouped based on the group ID "6001" has reserved a communication band where the band occupying rate is 9.3%. Note that the term used herein "secure" is to reserve a part of the communication band so that it will not be used for other communications based on the assumption of using the communication band.

FIG. 8 is a diagram conceptually illustrating an example of recorded contents of the requested band administrative table 22b with which the base station device 2 according to Embodiment 1 of the present application is provided. In the request administrative table 22b, the band occupying rate indicative of a communication band required for the call connection with each of the terminal devices 3, 3, . . . and a connection propriety flag indicative of the propriety of the call connection are recorded per record so as to be associated with the group ID and the IP addresses of the terminal devices 3, 3, . . . . Note that the band occupying rate indicative of the communication band is a value derived as a communication band required for the associated call connection of the terminal devices 3. For example, the record of the first line of the requested band administrative table 22b illustrated in FIG. 8 shows that the communication band of the band occupying rate of 7.4% is required when the terminal device 3 whose IP address is "192.168.1.55" and whose group ID is "6001" establishes the call connection. Similarly, the record of the second line shows that the communication band of the band occupying rate of 9.3% is required when the terminal device 3 whose IP address is "192.168.1.101" and whose group ID is "6001" establishes the call connection. Further, the record of the third line shows that the communication band of the band occupying rate of 15.6% is required when the terminal device 3 whose IP address is "192.168.1.102" and whose group ID is "6001" establishes the call connection. Thus, even if grouped into the same group ID, each of the terminal devices 3, 3, . . . differs in the required communication band from each other.

The requested band administrative table 22b illustrated in FIG. 8 is associated with the use band administrative table 22a illustrated in FIG. 7. In the use band administrative table 22a illustrated in FIG. 7, 90.0% of the communication band is already used by the communication according to the record of the first line and the communication according to the record of the second line. Therefore, because the terminal device 3 according to the record illustrated by the third line of FIG. 8 which requires the occupying rate of 15.6% cannot establish call connection, "0" indicating that establishment of the call connection is impossible is recorded as the connection propriety flag. Because the terminal devices 3, 3, . . . according to the records illustrated by the first line of FIG. 8 and the second line can establish call connection with the occupying rate of 15.6% or less, "1" indicating that establishment of the call connection is possible is recorded as the connection propriety flag. In the record according to the terminal devices 3, 3, . . . where the establishment of the call connection is possible, illustrated in FIG. 8, the record of the second line has the maximum occupying rate of "9.3%" of the communication band. Therefore, "9.3%" is secured as the communication band according to the group ID "6001" as illustrated in FIG. 7.

Figure 9:
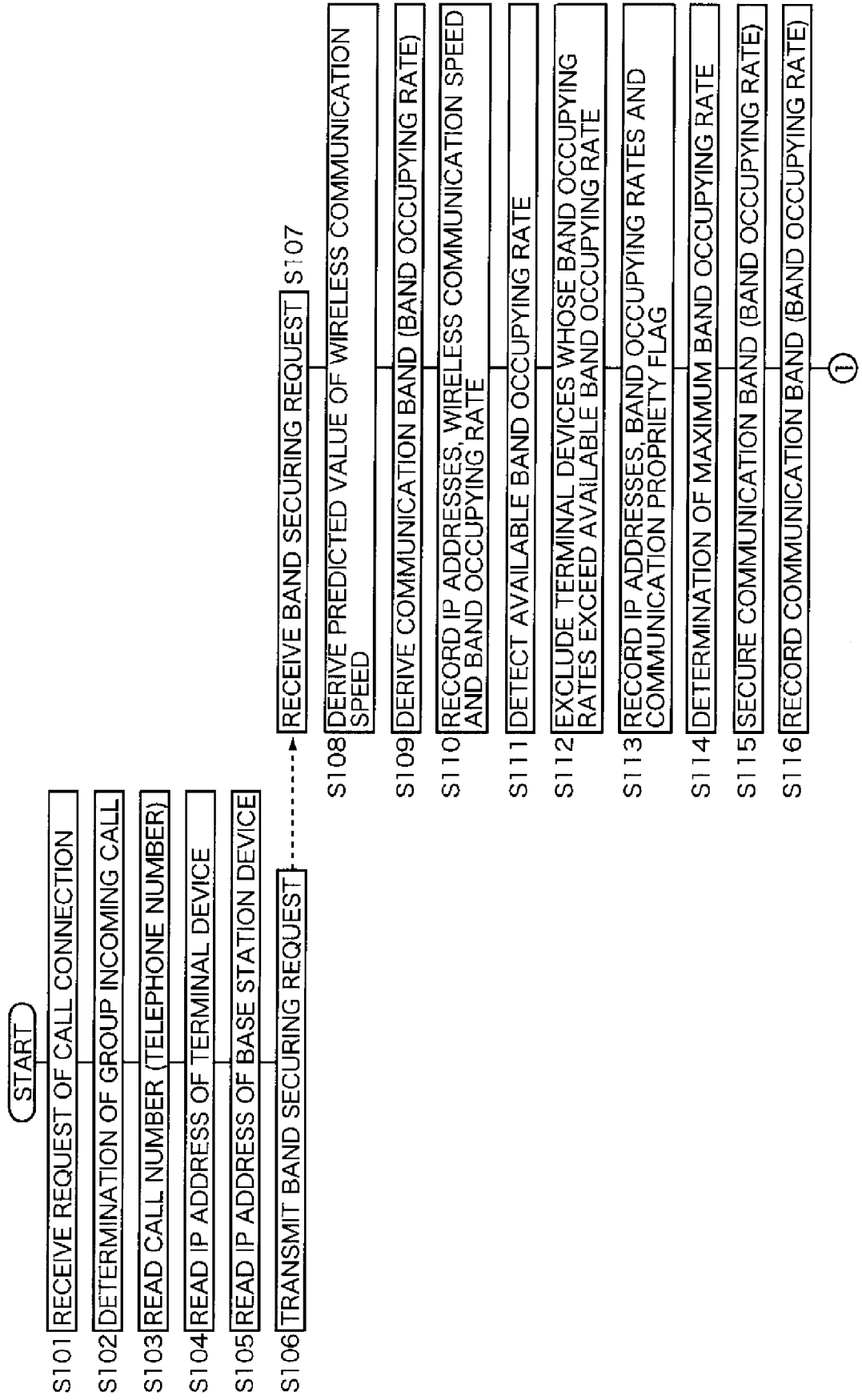
FIG. 9 is a flowchart showing an example of call connection establishment processing of the call control device and the base station device with which the communication system according to Embodiment 1 of the present application is provided.
Figure 10:
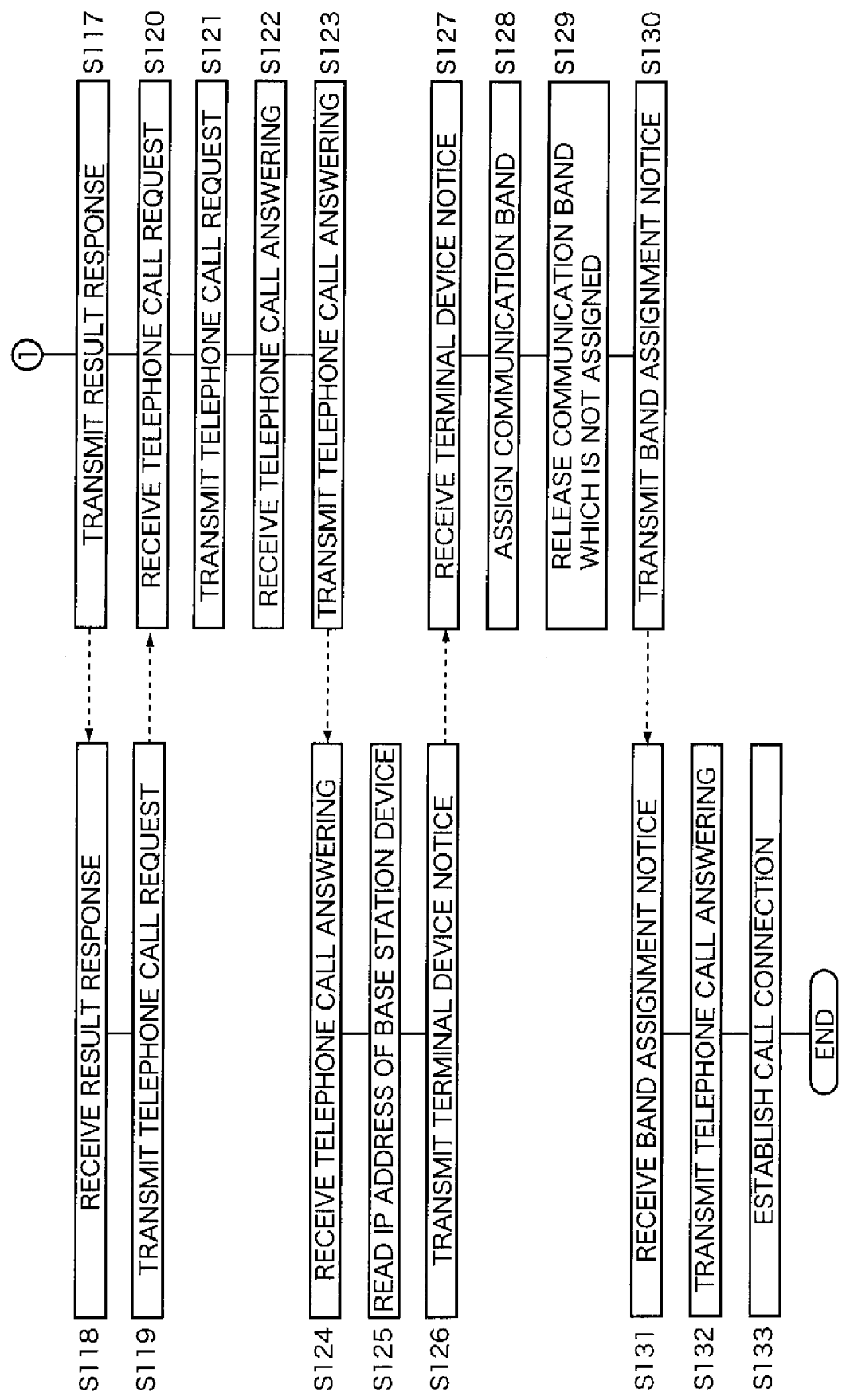
FIG. 10 is a flowchart showing an example of the call connection establishment processing of the call control device and the base station device with which the communication system according to Embodiment 1 of the present application is provided.

Next, processing of each device with which the communication system according to Embodiment 1 of the present application is provided is described. FIGS. 9 and 10 is a flowchart showing an example of a call connection establishment processing of the call control device 1 and the base station device 2 with which the communication system according to Embodiment 1 of the present application is provided. When the telephone 4 starts calling (that is, when a request for call connection is carried out) to the terminal device 3, the call control device 1 which received the request of call connection starts the call connection establishment processing. By the control of the control unit 10 that executes the computer program 1000, the call control device 1 receives with the communication unit 14 the request of call connection from the wired communication network 100 (S101). The request of call connection is in a form based on SIP, such as an INVITE message, and indicates a telephone number of the terminal device 3 to be a call target.

By the processing of the call control section 10a based on the control of the control unit 10, the call control device 1 refers to the group table 12a based on the telephone number indicated in the received request of call connection, and determines whether there is a telephone number to be a target of the group incoming call (S102). At Step S102, the determination is made by detecting whether the telephone number to be the call target indicated in the request of call connection is recorded in the group table 12a as the incoming call number. Here, by the determination, subsequent description is given as the telephone number being a target of the group incoming call.

By processing of the call control section 10a based on the control of the control unit 10, the call control device 1 reads a plurality of telephone numbers recorded in the group table 12a as call numbers so as to be associated with the telephone number received as the request of call connection (i.e., the incoming call number) (S103). For example, when the group table 12a illustrated in FIG. 4 is used and when the incoming call number is "6001," the call control device 1 reads "6001," "6011," and "6012" at Step S103.

By processing of the call control section 10a based on the control of the control unit 10, the call control device 1 reads each IP address recorded in the specifying information table 12b as the specifying information so as to be associated with the read plurality of telephone numbers (S104). For example, when the specifying information table 12b illustrated in FIG. 5 is used and the plurality of telephone numbers are "6001," "6011," and "6012," "192.168.1.55," "192.168.1.101," and "192.168.1.102" are read as the specifying information corresponding to each.

By processing of the call authentication control section 10b based on the control of the control unit 10, the call control device 1 reads the IP address of the base station device 2 recorded in the attribute table 12c as an access point so as to be associated with each of the read IP addresses (S105). For example, when the attribute table 12c illustrated in FIG. 6 is used and the IP addresses are "192.168.1.55," "192.168.1.101," and "192.168.1.102," "192.168.1.1" is read as the IP address of the base station device 2. In this case, the plurality of terminal devices 3, 3, . . . use a single base station device 2 as its access point.

By processing of the call authentication control section 10b based on the control of the control unit 10, the call control device 1 transmits the band securing request for requesting securing of a band required for the establishment of the call connection from the communication unit 14 via the wired communication network 100 to the base station device 2 indicated by the read IP address (S106).

FIG. 11 is a diagram conceptually illustrating an example of information included in the band securing request transmitted from the call control device 1 according to Embodiment 1 of the present application. The band securing request indicates the IP addresses which are specifying information on the plurality of terminal devices 3, 3, . . . to be call targets as targets of the call connection establishment, a classification of the request, and a group ID according to the group incoming call. Herein, the classification of the request is information indicative of band securing for audio communications.

Returning to the flowchart of FIGS. 9 and 10, by the control of the control unit 20 that executes the computer program 2000, the base station device 2 receives with the wired communication unit 24 the band securing request from the wired communication network 100 (S107).

By processing of the band deriving section 20a based on the control of the control unit 20, the base station device 2 derives a predicted value of a wireless communication speed as a link rate according to communication in a wireless section at the time of the call connection establishment, for the plurality of terminal devices 3, 3, . . . to be the call targets indicated in the band securing request (S108). The predicted value of the wireless communication speed is derived based on a numerical value related to communication environments, such as electric wave intensities according to the wireless communication between the base station device 2 and each of the terminal devices 3, 3, . . . , and an RTT (Round Trip Time) of a communication check packet (PING), for example. For example, when the electric wave intensity is less than −75 dBm, the wireless communication speed will be derived to be 1 Mbps. Similarly, when the wireless communication speeds are greater than −75 dBm and less than −70 dBm, greater than −70 dBm and less than −65 dBm, greater than −65 dBm and less than −60 dBm, and greater than −60 dBm, the electric wave intensities are derived to be 2 Mbps, 5.5 Mbps, and 11 Mbps, respectively. Further, the base station device 2 may transmit the communication check packet to each of the terminal devices 3, 3, . . . and may derive the predicted value of the wireless communication speed based on the RTT indicative of a time required from transmission to reception.

By processing of the band deriving section 20a based on the control of the control unit 20, the base station device 2 derives a communication band required for the call connection required for each of the terminal devices 3, 3, . . . to be call targets, based on the predicted value of the wireless communication speed and the wired communication band to be used for communication in the wired section of the call connection (S109). The band occupying rate is used for the communication band required for the call connection in the example shown in this embodiment. The band occupying rate is a value which indicates a rate by percentage of the time required for the communication to be a target of the calculation with respect to the entire communication time. Note that, in the example shown in this embodiment, the band occupying rate is derived by using an approximate equation shown in the following Equation 1.

$$\text{Band occupying rate} = \text{control band} + (\text{wired communication band}/\text{wireless communication speed}) \times \text{constant} \quad (\text{Equation 1})$$

In Equation 1, the band occupying rate is a value which indicates a share to the communication band between the wireless sections according to the base station device 2 by percentage (%). The control band is a value by percentage which indicates a communication band required for the control of the communication in the wireless sections, and, for example, is set in advance with a value, such as 5%. The wired communication band is a band used for the communication in the wired section of the call connection, and for example, is set in advance with a value, such as 128 kbps if it is a telephone call by audio communication. The wireless communication speed is a link rate derived at Step S108. The constant is a value set in advance.

By processing of the band deriving section 20a based on the control of the control unit 20, the base station device 2 stores the IP addresses of the terminal devices 3, 3, . . . to be call targets, the wireless communication speed which is derived by the predicted value, and the derived band occupying rate (communication band) in the storing unit 23 so as to be associated with each other (S110). At Step S110, they may be stored in the recording unit 22.

FIG. 12 is a diagram conceptually illustrating an example of the IP addresses, the wireless communication speeds, and the band occupying rates stored in the base station device 2 according to Embodiment 1 of the present application. By the above-mentioned processing, the base station device 2 stores the derived wireless communication speed and the derived band occupying rate in the storing unit 23 so as to be associated with the IP address. For example, the wireless communication speed of the terminal device 3 whose IP address is "192.168.1.55" is "11 Mbps," and the band occupying rate is "7.4%." Further, for example, the wireless communication speed of the terminal device 3 whose IP address is "192.168.1.101" is "5.5 Mbps," and the band occupying rate is "9.3%." For example, the wireless communication speed of the terminal device 3 whose IP address is "192.168.1.102" is "2 Mbps," and the band occupying rate is "15.6%."

Returning to the flowchart of FIGS. 9 and 10, by processing of the band securing section 20b based on the control of the control unit 20, the base station device 2 detects a band occupying rate which can be used with reference to the use band administrative table 22a (S111), then excludes the terminal devices 3, 3, . . . whose band occupying rates stored at Step S110 exceeds the band occupying rate which can be used (communication band) from the targets to be called to establish the call connection (S112), and then stores the group ID of the terminal devices 3, 3, . . . to be the targets of the call, the IP addresses of the terminal devices 3, 3, . . . , and the derived band occupying rate and the connection propriety flag in the requested band administrative table 22b (S113). If it is detected that 90.0% of the communication band is already used and the band occupying rate which can be used is 10% at Step S111, the terminal devices 3, 3, . . . requiring the band occupying rate exceeding 10% are excluded from the target of the call at Step S112. For example, in FIG. 8, the terminal device 3 whose band occupying rate is "15.6%" will have the connection propriety flag of "0" and is excluded from the target of the call.

By processing of the band securing section 20b based on the control of the control unit 20, the base station device 2 determines a band occupying rate which requires a communication band having the maximum width among the band occupying rates of the terminal devices 3, 3, . . . other than the excluded terminal devices 3, 3, . . . with reference to the requested band administrative table 22b (S114), then secures the determined maximum communication band (band occupying rate) as a reserved band in the communication band which can be used (S115), and then records the secured communication band (band occupying rate) so as to be associated with the group ID in the use band administrative table 22a (S116). At Step S114, if the band occupying rates are "7.4%" and "9.3%," the band occupying rate indicative of the communication band having the maximum width will be "9.3%." FIG. 7 described above shows recorded contents at Step S116, the band occupying rate "9.3%" is recorded so as to be associated with the group ID "6001."

Then, by the control of the control unit 20, the base station device 2 transmits a resulted response to the band securing request from the wired communication unit 24 to the call control device 1 via the wired communication network 100 (S117).

FIG. 13 is a diagram conceptually illustrating an example of information included in the resulted response transmitted from the base station device 2 according to Embodiment 1 of the present application. The resulted response indicates the IP addresses of the terminal devices 3, 3, . . . corresponding to the group ID, and the proprieties of the call. In the example shown in FIG. 13, the terminal device 3 and 3 whose IP addresses are "192.168.1.55" and "192.168.1.101" are callable, and the terminal device 3 whose IP address is "192.168.1.102" is not callable.

Returning to the flowchart of FIGS. 9 and 10, by processing of the call authentication control section 10b based on the control of the control unit 10, the call control device 1 receives with the communication unit 14 the resulted response from the wired communication network 100 (S118). By the processing of the call control section 10a based on the control of the control unit 10, the call control device 1 then transmits a telephone call request for calling the terminal devices 3, 3, . . . from the communication unit 14 to the base station device 2 via the wired communication network 100 based on the IP addresses of the terminal devices 3, 3, . . . indicated as callable in the resulted response (S119). In the telephone call request, the IP addresses of the terminal devices 3, 3, . . . to be the targets of the call are indicated.

By the control of the control unit 20, the base station device 2 receives with the wired communication unit 24 the telephone call request via the wired communication network 100 (S120), and then transmits the received telephone call request from the wireless communication unit 25 to the terminal devices 3, 3, . . . (S121).

The terminal devices 3, 3, . . . corresponding to the IP addresses indicated in the telephone call request receive the telephone call request, and then carry out a call-in operation, such as ringing of a call sound. Then, a user operates the terminal device 3 being in a ringing state to answer it, and thereby the terminal device 3 transmits a 200OK packet to the base station device 2 as telephone call answering indicating that he/she will answers to the call. In the telephone call answering to be transmitted, the IP address of the answering terminal device 3 is indicated.

By the control of the control unit 20, the base station device 2 receives the telephone call answering with the wireless communication unit 25 (S122), and then transmits the 200OK packet from the wired communication unit 24 to the call control device 1 via the wired communication network 100 as the received telephone call answering (S123).

By the processing of the call control section 10a based on the control of the control unit 10, the call control device 1 receives with the communication unit 14 the telephone call answering via the wired communication network 100 (S124). The call control device 1 then notifies the IP address of the responded terminal device 3 which is indicated in the received telephone call answering to the call authentication control section 10b, and by processing of the call authentication control section 10b based on the control of the control unit 10, then reads the IP address of the base station device 2 which is recorded in the attribute table 12c as an access point so as to be associated with the IP address of the notified terminal device 3 (S125).

By processing of the call authentication control section 10b based on the control of the control unit 10, the call control device 1 transmits a terminal device notice for notifying the IP address and the group ID of the terminal device 3 which establishes call connection to the base station device 2 indicated by the read IP address, from the communication unit 14 to the base station device 2 via the wired communication network 100 (S126).

The base station device 2 then receives with the wired communication unit 24 the terminal device notice from the wired communication network 100 by the control of the control unit 20 (S127).

By processing of the band assigning section 20c based on the control of the control unit 20, the base station device 2 assigns a communication band to be occupied in the communication band secured as a reserved band to the terminal device 3 according to the IP address indicated in the received terminal device notice (S128). In the terminal device notice, the IP address and the group ID are indicated. Further, the secured communication band is recorded in the use band administrative table 22a so as to be associated with the group ID, and the band occupying rate is recorded in the requested band administrative table 22b so as to be associated with the IP address. For example, when the use band administrative table 22a illustrated in FIG. 7 and the requested band administrative table 22b illustrated in FIG. 8 are used, and when the communication band is assigned to the terminal device 3 whose IP address is "192.168.1.55," a communication band of 7.4% will be assigned among the secured band occupying rate of 9.3%. Because securing of the communication band will be canceled at Step S128, and the communication band will be assigned to the terminal device 3 which establishes the call connection, the base station device 2 updates, for the use band administrative table 22a, the record associating the group ID "6001" with the band occupying rate "9.3%" is indicated by associating the IP address "192.168.1.55" with "7.4%." Further, the base station device 2 deletes, for the use band administrative table 22a, the record according to the group ID "6001." As described above, upon the assignment of the communication band to be occupied by the terminal device 3 at Step S128, the base station device 2 updates, for the use band administrative table 22a, the communication band secured so as to be associated with the group ID by the communication band associated with the IP address. The base station device 2 carries out, for the requested band administrative table 22b, a reservation cancel for deleting the record which records so as to be associated with the group ID.

By the control of the control unit 20, the base station device 2 releases a communication band which is not assigned in the secured communication band (S129). For example, when the secured band occupying rate is 9.3% and the communication band of 7.4% is assigned at Step S128, the communication band of 1.9% is released to make it into a state which can be used by other communications.

Then, by the control of the control unit 20, the base station device 2 transmits a band assignment notice indicating that the assignment of the communication band, the cancellation of the reservation, and the release of the communication band were performed, from the wired communication unit 24 to the call control device 1 via the wired communication network 100 (S130).

By processing of the call authentication control section 10b based on the control of the control unit 10, the call control device 1 receives with the communication unit 14 the band assignment notice from the wired communication network 100 (S131), and then, by processing of the call control section 10a, transmits a 200OK packet to the telephone 4 as a telephone call answering (S132), and thereby establishing call connection between the telephone 4 and the answered terminal device 3 (S133). Thus, the call connection establishment processing according to Embodiment 1 of the present application is carried out.

Embodiment 2

Figure 14:
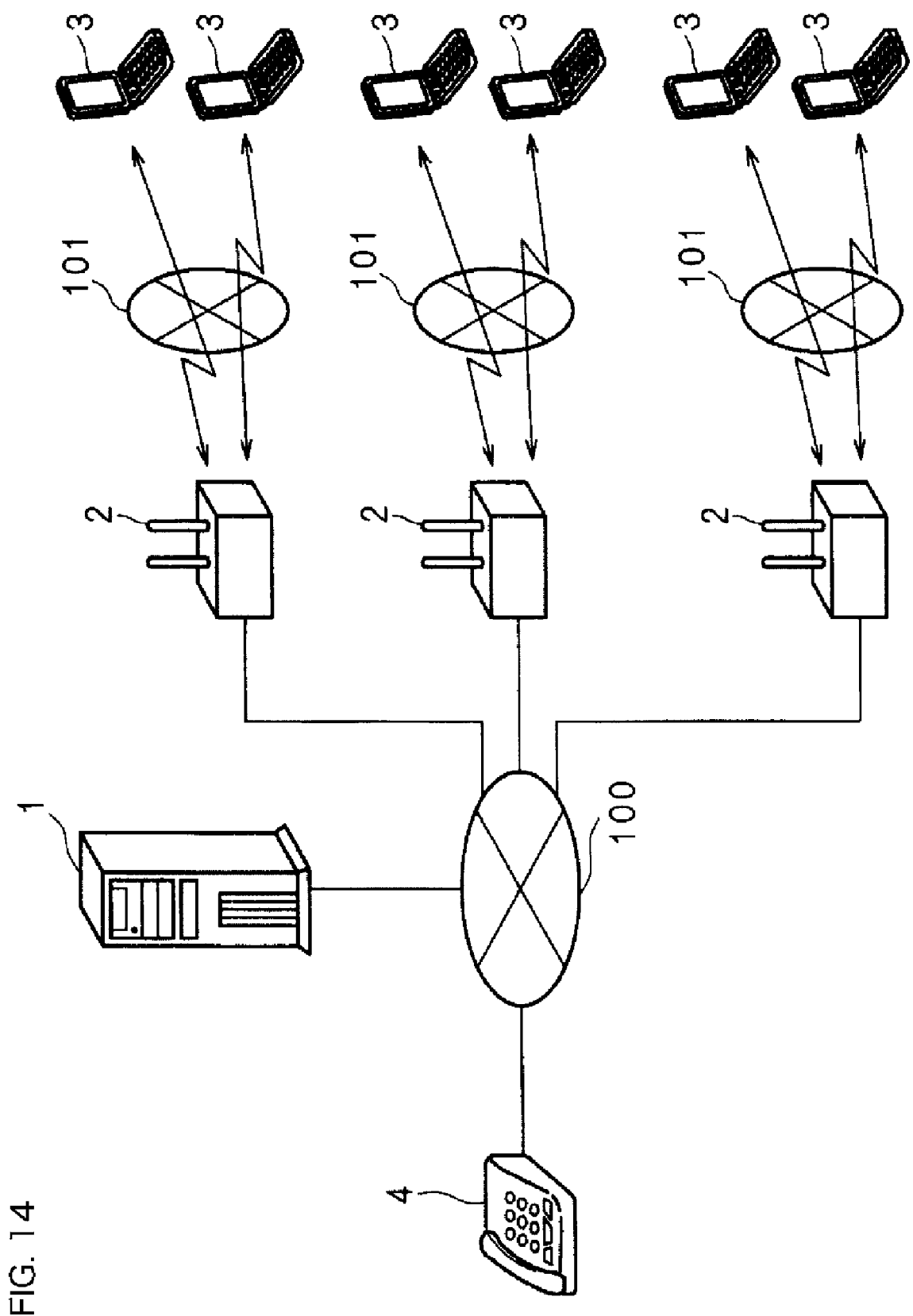
FIG. 14 is a diagram conceptually illustrating a configuration example of a communication system according to Embodiment 2 of the present application.

Embodiments 2 shows a form of Embodiment 1 in which a plurality of terminal devices 3, 3, . . . which belong to a plurality of base station devices 2, 2, . . . are made in a group. FIG. 14 is a diagram conceptually illustrating a configuration example of a communication system according to Embodiment 2 of the present application. Note that, for the same configurations as Embodiment 1, similar reference numerals to those of Embodiment 1 are assigned, and thereby the description thereof is omitted. In Embodiment 2, the plurality of base station devices 2, 2, . . . are used, and each of the base station devices 2, 2, . . . connects with the respective terminal devices 3, 3, . . . via the respective wireless communication networks 101, 101, . . . . The access points of the terminal devices 3, 3, . . . according to a single group to be a target of a call extends over the plurality of base station devices 2, 2, . . . .

Because the hardware configuration and function of each device with which the communication system according to Embodiment 2 is provided are the same as those of Embodiment 1, the description is omitted while referring to Embodiment 1.

FIG. 15 is a diagram showing an example of recorded contents of the attribute table 12c with which the call control device 1 according to Embodiment 2 of the present application is provided. The various tables with which the call control device 1 is provided and the various tables with which the base station device 2 is provided are substantially the same as those of Embodiment 1. Although the attribute table 12c is also similar to that of Embodiment 1, because the IP address of the base station device 2 which will be an access point has a plurality of types, an example thereof is shown. In the example indicated in the attribute table 12*c* according to Embodiment 2, the terminal devices 3, 3, . . . whose IP addresses are "192.168.1.100," "192.168.1.101," and "192.168.1.102" connect with the wireless communication network 101 by using the base station device 2 whose IP address is "192.168.1.1" as an access point. Further, the terminal devices 3, 3, . . . whose IP addresses are "192.168.2.85," "192.168.2.86," and "192.168.2.87" connect with the wireless communication network 101 by using the base station device 2 whose IP address is "192.168.2.1" as an access point. Note that, in subsequent description, the six terminal devices 3, 3, . . . for which the IP addresses are shown in FIG. 15 are assumed to be grouped in the same group whose group ID is "6002."

Next, processing of each device with which the communication system according to Embodiment 2 of the present application is provided is described. In Embodiment 2, the call control device 1 carries out the processing from reception of the request of call connection to transmission of the band securing request as similar to the processing according to Steps S101 to S106 of the call connection establishment processing of Embodiment 1. However, because there are a plurality of IP addresses of the base station devices 2, 2, . . . corresponding to the IP addresses of the terminal devices 3, 3, . . . , the band securing request is transmitted to the plurality of base station devices 2, 2, . . . as the processing of Step S106. That is, as the processing corresponding to Steps S101 to S106 of the call connection processing of Embodiment 1, the call control device 1 according to Embodiment 2 carries out, in response to a single request of call connection, processing for calling the terminal devices 3, 3, . . . according to the plurality of base station devices 2, 2, . . . .

Each of the base station devices 2, 2, . . . carries out processing from the reception of the band securing request to transmission of the resulted response to the band securing request, similar to the processing according to Steps S107 to S117 of the call connection establishment processing of Embodiment 1. However, each of the base station devices 2, 2, . . . carries out processing, such as derivation of a communication band, detection of a band occupying rate which can be used, securing of the communication band having the maximum width for the terminal devices 3, 3, . . . which connect by using themselves as access points. For example, when three terminal devices 3, 3, and 3 among the terminal devices 3, 3, . . . which use a first base station device 2 as an access point are the targets of the call of the group incoming call, and when the band occupying rate which can be used is "10.0%" and the band occupying rates of the terminal devices 3, 3, and 3 are "7.4%," "9.3%," and "15.6%," respectively, the first base station device 2 secures 9.3% of the communication band. Further, when three terminal devices 3, 3, and 3 among the terminal devices 3, 3, . . . which use a second base station device 2 as an access point are the targets of the call of the group incoming call, and when the band occupying rate which can be used is "12.0%" and the band occupying rate of the terminal devices 3, 3, and 3 are "7.4%," "7.4%," and "9.3%," respectively, the first base station device 2 secures 9.3% of the communication band. Then, the first base station device 2 and the second base station device 2 secure a communication band, respectively, and transmit the resulted response to the call control device 1. Note that, in this case, the resulted response transmitted from the first base station device 2 indicates that the two terminal devices 3 and 3 are callable and the single terminal device 3 is not callable.

Then, similar to the processing according to Steps S118 to S130 of the call connection establishment processing according to Embodiment 1, the call control device 1 and the base station devices 2, 2, . . . carries out the processing from reception of the resulted response to the transmission of the band assignment notice. Here, although the call control device 1 transmits the terminal device notice and establishes the call connection for the base station device 2 which relayed the telephone call answering transmitted from the first answered terminal device 3, the call control device 1 transmits to other base station devices 2 a cut-off request to stop ringing of the terminal devices 3, 3, . . . and release the secured communication band.

Then, the call control device 1 carries out processing from reception of the band assignment notice to establishment of the call connection, similar to the processing according to Steps S131 to S133 of the call connection establishment processing according to Embodiment 1. Thus, the call connection establishment processing according to Embodiment 2 of the present application is carried out.

Embodiment 3

Embodiment 3 is a form of Embodiment 1 in which processing, such as securing of the communication band is performed by the call control device. Because the configuration example of the communication system according to Embodiment 3 and the hardware configuration of each device with which the communication system is provided are similar to those of Embodiment 1, they are assigned with similar reference numerals to those of Embodiment 1, and thereby omitting their description.

Figure 16:
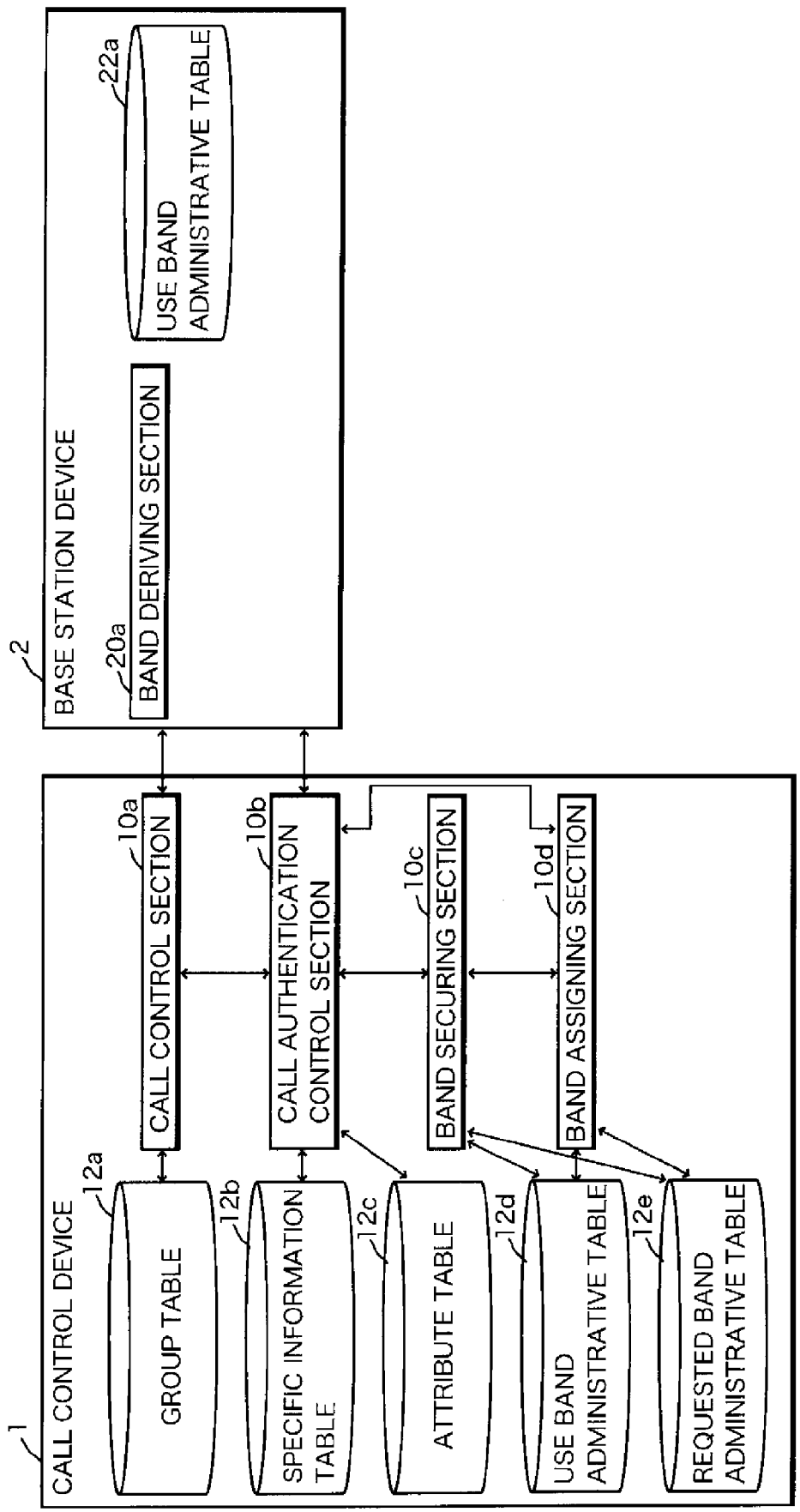
FIG. 16 is a functional block diagram showing an example of a function of each device with which a communication system according to Embodiment 3 of the present application is provided.

FIG. 16 is a functional block diagram showing an example of a function of each device with which the communication system according to Embodiment 3 of the present application is provided. The call control device 1 of the present application executes with the control unit 10 the various computer programs according to the call control of the computer program 1000 or the like for the call control device of the present application to function the control unit 10 as various program modules, such as the call control section 10*a*, the call authentication control section 10*b*, the band securing section 10*c*, and the band assigning section 10*d*. Note that the band securing section 10*c* and the band assigning section 10*d* correspond to the band securing section 20*b* and the band assigning section 20*c* according to the base station device 2 in Embodiment 1. Further, by executing with the control unit 10 the various computer programs according to the call control of the computer program 1000 or the like for the call control device of the present application, various tables, such as the group table 12*a*, the specifying information table 12*b*, the attribute table 12*c*, the use band administrative table 12*d*, and the requested band administrative table 12*e*, are generated in a recording area of the recording unit 12. Note that the use band administrative table 12*d* and the requested band administrative table 12*e* correspond to the use band administrative table 22*a* and the requested band administrative table 22*b* according to the base station device 2 in Embodiment 1.

The base station device 2 of the present application executes with the control unit 20 the various computer programs of the computer program 2000 or the like for the base station device of the present application to function the control unit 20 as various program modules, such as the band deriving section 20*a*. Further, the base station device 2 of the present application executes with the control unit 20 the various computer programs of the computer program 2000 or the like for the base station device of the present application to generate various tables, such as the use band administrative table 22*a* for recording a use condition of a communication band on a recording area of the recording unit 22. However, unlike the use band administrative table 22a according to Embodiment 1, the use band administrative table 22a according to Embodiment 3 does not record a record according to a reserved group ID which has not established call connections.

FIG. 17 is a diagram conceptually illustrating an example of recorded contents of the use band administrative table 12d with which the call control device 1 according to Embodiment 3 of the present application is provided. The use band administrative table 12d records a record of an IP address for specifying the base station device 2, information indicative of terminal device(s) 3 which uses or reserves for use of a communication band for communication, such as call connection, or a group thereof, and a band occupying rate indicative of the communication band which is used or reserved for use, so as to be associated with each other. The use band administrative table 12d according to Embodiment 3 has a configuration in which the IP address of the base station device 2 is added to the use band administrative table 22a of Embodiment 1. Note that because the band occupying rate is administrated in the use band administrative table 12d with which the call control device 1 is provided, the band occupying rate is not necessarily recorded in the use band administrative table 22a with which the base station device 2 is provided.

FIG. 18 is a diagram conceptually illustrating an example of recorded contents of the requested band administrative table 12e with which the call control device 1 according to Embodiment 3 of the present application is provided. In the requested band administrative table 12e, associating with the IP address which specifies the base station device 2, a group ID and IP addresses of the terminal devices 3, 3, . . . , a band occupying rate indicative of a communication band required for call connection of each of the terminal devices 3, 3, . . . , and a connection propriety flag indicative of the propriety of the call connection are recorded per record. The requested band administrative table 12e according to Embodiment 3 has a configuration in which the IP address of the base station device 2 is added to the requested band administrative table 22b of Embodiment 1.

Figure 19:
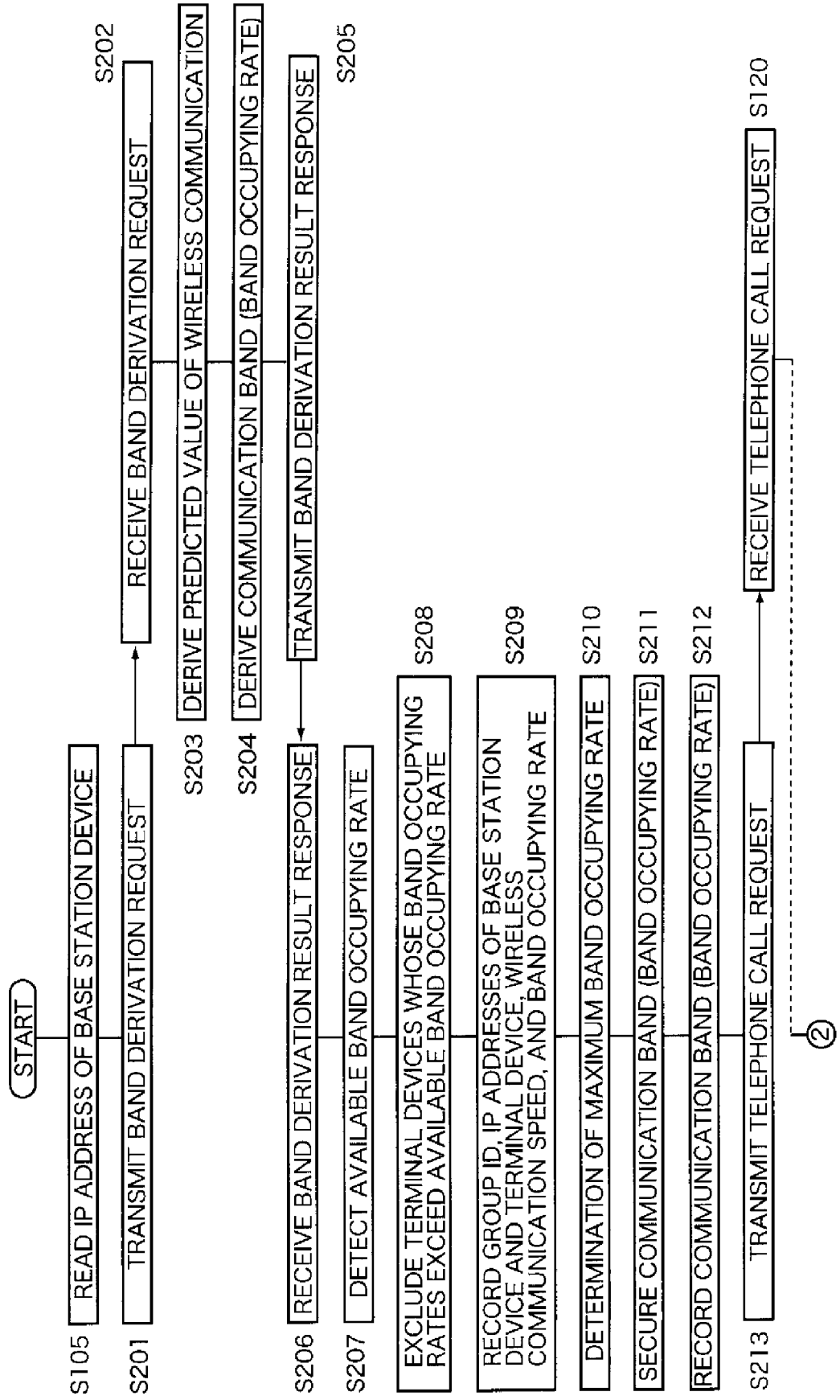
FIG. 19 is a flowchart showing an example of call connection establishment processing of the call control device and a base station device with which the communication system according to Embodiment 3 of the present application is provided.
Figure 20:
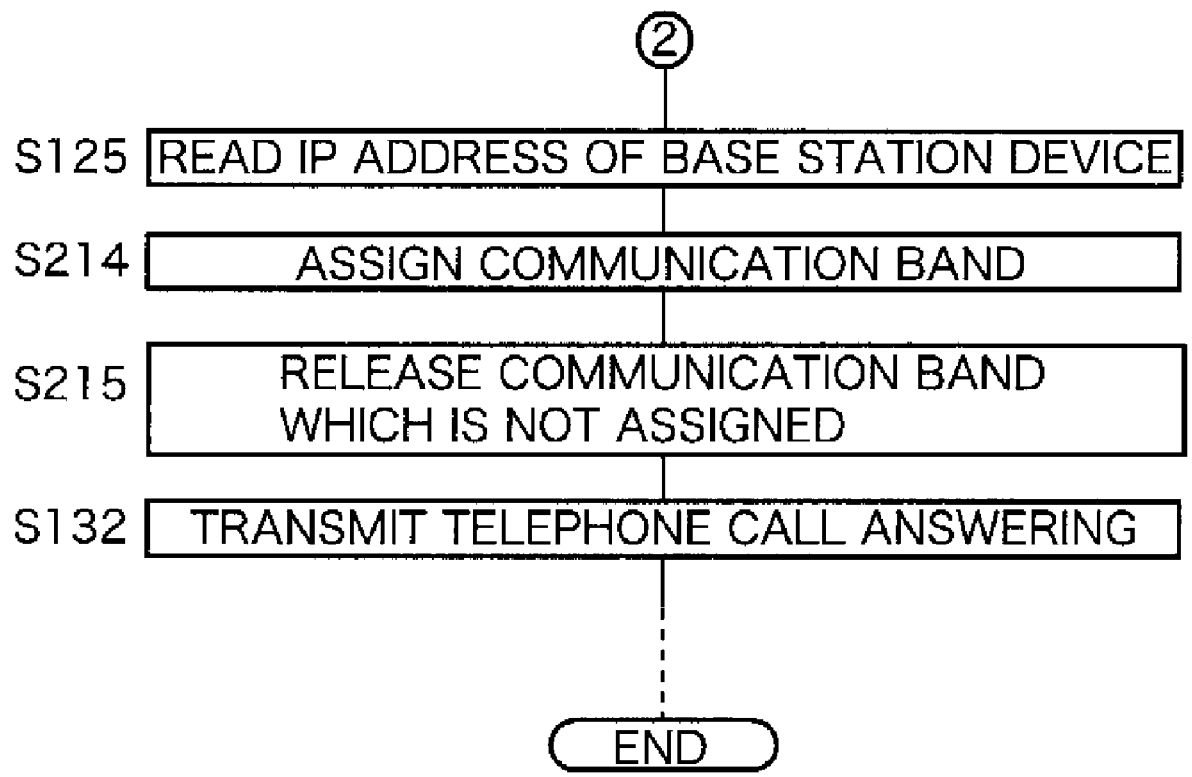
FIG. 20 is a flowchart showing an example of the call connection establishment processing of the call control device and the base station device with which the communication system according to Embodiment 3 of the present application is provided.

Next, processing of each device with which the communication system according to Embodiment 3 of the present application is provided is described. FIGS. 19 and 20 is a flowchart showing an example of call connection establishment processing of the call control device 1 and the base station device 2 with which the communication system according to Embodiment 3 of the present application is provided. The call control device 1 carries out processing from reception of the request of call connection to reading of the IP address of the base station device 2, similar to the processing according to Steps S101 to S105 of the call connection establishment processing of Embodiment 1.

By the control of the control unit 10 that executes the computer program 1000, the call control device 1 transmits, for the terminal devices 3, 3, . . . to be targets of the call, a band derivation request for requesting derivation of a communication band required for the call connection, from the communication unit 14 via the wired communication network 100 to the base station device 2 indicated by the read IP address (S201). In the band derivation request transmitted at Step S201, the IP addresses of the terminal devices 3, 3, . . . to be the targets of the call are indicated.

By processing of the band deriving section 20a based on the control of the control unit 20 that executes the computer program 2000, the base station device 2 receives with the wired communication unit 24 a band derivation request from the wired communication network 100 (S202).

Then, by processing of the band deriving section 20a based on the control of the control unit 20, the base station device 2 derives, for the plurality of terminal devices 3, 3, . . . to be the call targets indicated in the band securing request, predicted values of wireless communication speeds as link rates according to communications in wireless sections at the time of the call connection establishment (S203), then derives a communication band required for the call connection of each of the terminal devices 3, 3, . . . based on the predicted value of the wireless communication speed and the wired communication band used for communication in the wired section of the call connection (S204), and then transmits the band derivation resulted response indicating the IP addresses of each of the terminal devices 3, 3, . . . and the derived communication band (band occupying rate) of each of the terminal devices 3, 3, . . . so that they are associated with each other from the wired communication unit 24 to the call control device 1 via the wired communication network 100 (S205).

By processing of the band securing section 10c based on the control of the control unit 10, the call control device 1 receives with the communication unit 14 the band derivation resulted response from the wired communication network 100 (S206).

Then, by the processing of the band securing section 10c based on the control of the control unit 10, the call control device 1 detects the band occupying rate which can be used based on the recorded contents of the use band administrative table 12d associated with the IP address of the base station device 2 which is a transmission source of the received band derivation resulted response (S207), then excludes the terminal devices 3, 3, . . . whose band occupying rate indicated in the band derivation resulted response exceeds a band occupying rate which can be used (communication band) from the targets to be called to establish call connection (S208), and then records a group ID of the terminal devices 3, 3, . . . to be the targets of the call, the IP address of the base station device 2, the IP addresses of the terminal devices 3, 3, . . . , the derived band occupying rate, and the connection propriety flag in the requested band administrative table 12e (S209).

By processing of the band securing section 10c based on the control of the control unit 10, the call control device 1 determines a band occupying rate which requires a communication band having the maximum width among the band occupying rates of the terminal devices 3, 3, . . . other than the excluded terminal devices 3, 3, . . . with reference to the requested band administrative table 12e (S210), then secures the determined maximum communication band (band occupying rate) as a reserved band in the communication band which can be used (S211). The call control device 1 then records the secured communication band (band occupying rate) in the use band administrative table 12d so as to be associated with the IP address and the group ID of the base station device 2 (S212). Further, the call control device 1 notifies the secured communication band to the base station device 2, and then inhibits the base station device 2 from using the secured communication band.

By the processing of the call control section 10a based on the control of the control unit 10, the call control device 1 transmits a telephone call request for calling the terminal devices 3, 3, . . . from the communication unit 14 to the base station device 2 via the wired communication network 100 based on the IP addresses of the terminal devices 3, 3, . . . determined to be callable whose connection propriety flag is "1" (S213).

Then, the call control device 1 and the base station device 2 carry out, similar to the processing according to Steps S120 to S125 of the call connection establishment processing according to Embodiment 1, processing from the base station device 2 receiving the telephone call request to the call control device 1 reading the IP address of the base station device 2 used as an access point of the terminal device 3 which answered the call.

Then, by processing of the band assigning section 20c based on the control of the control unit 20, the call control device 1 assigns a communication band to be occupied in the communication band secured as a reserved band to the terminal device 3 which answered the call (S214). Further, the call control device 1 notifies the assigned communication band to the base station device 2, then assigns, to the base station device 2, a communication band to be occupied in the communication band which has been secured, and then releases communication band(s) which is not assigned (S215).

Then, the call control device 1 carries out processing for establishing call connection, similar to the processing of Step S132 of the call connection establishment processing of Embodiment 1 and subsequent processing. Thus, the call connection establishment processing according to Embodiment 3 of the present application is carried out.

Embodiment 4

Embodiment 4 is a form of Embodiment 1 in which a call authentication control section is provided with a base station device. Because a configuration example of a communication system according to Embodiment 4 and a hardware configuration of each device with which the communication system is provided are similar to those of Embodiment 1, they are assigned with similar reference numerals to those of Embodiment 1, and thereby omitting their description.

Figure 21:
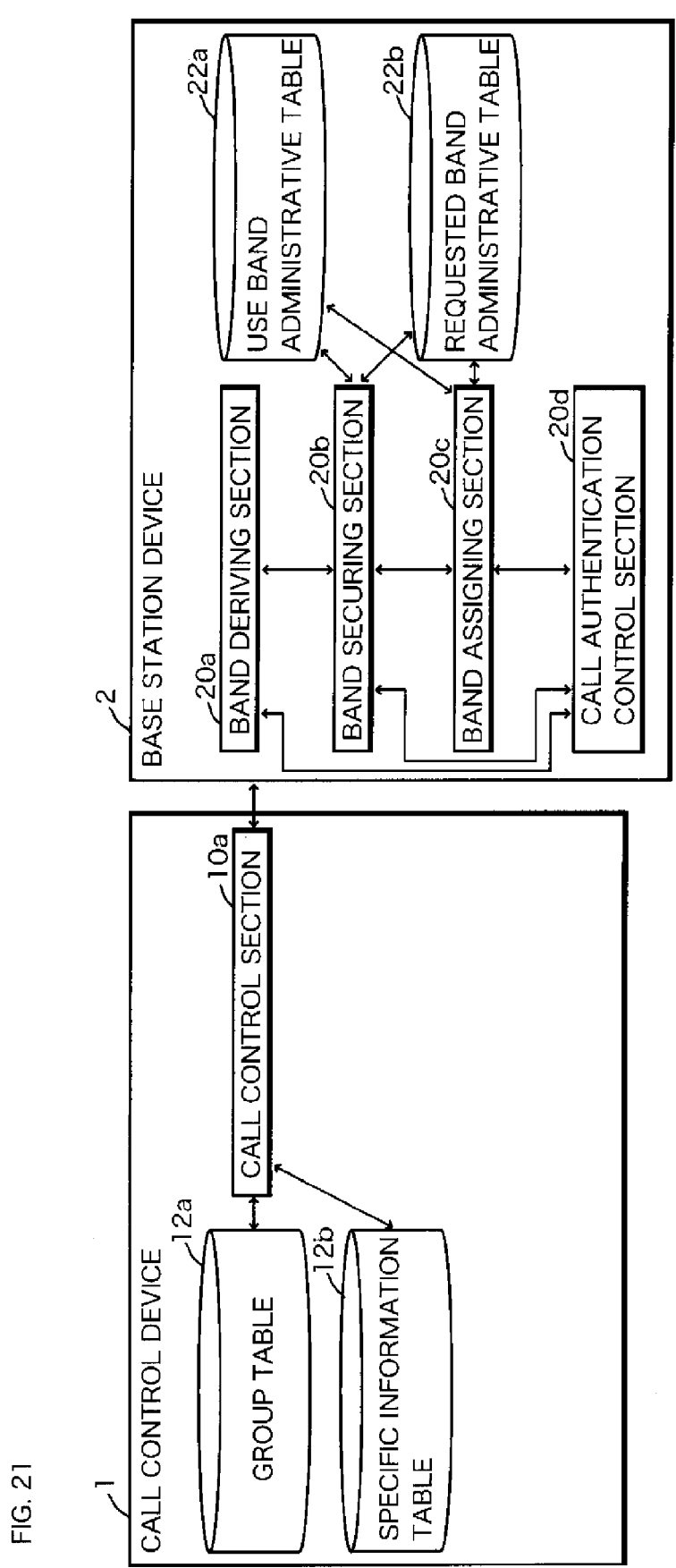
FIG. 21 is a functional block diagram showing an example of a function of each device with which a communication system according to Embodiment 4 of the present application is provided.

FIG. 21 is a functional block diagram showing an example of a function of each device with which the communication system according to Embodiment 4 of the present application is provided. The call control device 1 of the present application causes the control unit 10 to function as various program modules, such as call control section 10a, by executing with the control unit 10 the various computer programs according to the call control of the computer program 1000 or the like for the call control device of the present application. Further, by executing with the control unit 10 the various computer programs according to the call control of the computer program 1000 or the like for the call control device of the present application, various tables, such as the group table 12a and the specifying information table 12b, are generated in a recording area of the recording unit 12.

The base station device 2 of the present application causes, by executing with the control unit 20 the various computer programs of the computer program 2000 or the like for the base station device of the present application, the control unit 20 to function as various program modules, such as the band deriving section 20a, the band securing section 20b, the band assigning section 20c, and the call authentication control section 20d. Note that the call authentication control section 20d correspond to the call authentication control section 10b according to the call control device 1 in Embodiment 1. Further, by executing with the control unit 20 the various computer programs of the computer program 2000 or the like for the base station device of the present application, various tables, such as the use band administrative table 22a and the requested band administrative table 22b, are generated in a recording area of the recording unit 22. Note that because the base station device 2 administrates the connected terminal devices 3, 3, . . . , the attribute table 12c according to Embodiment 1 is not necessarily required in this embodiment.

Figure 22:
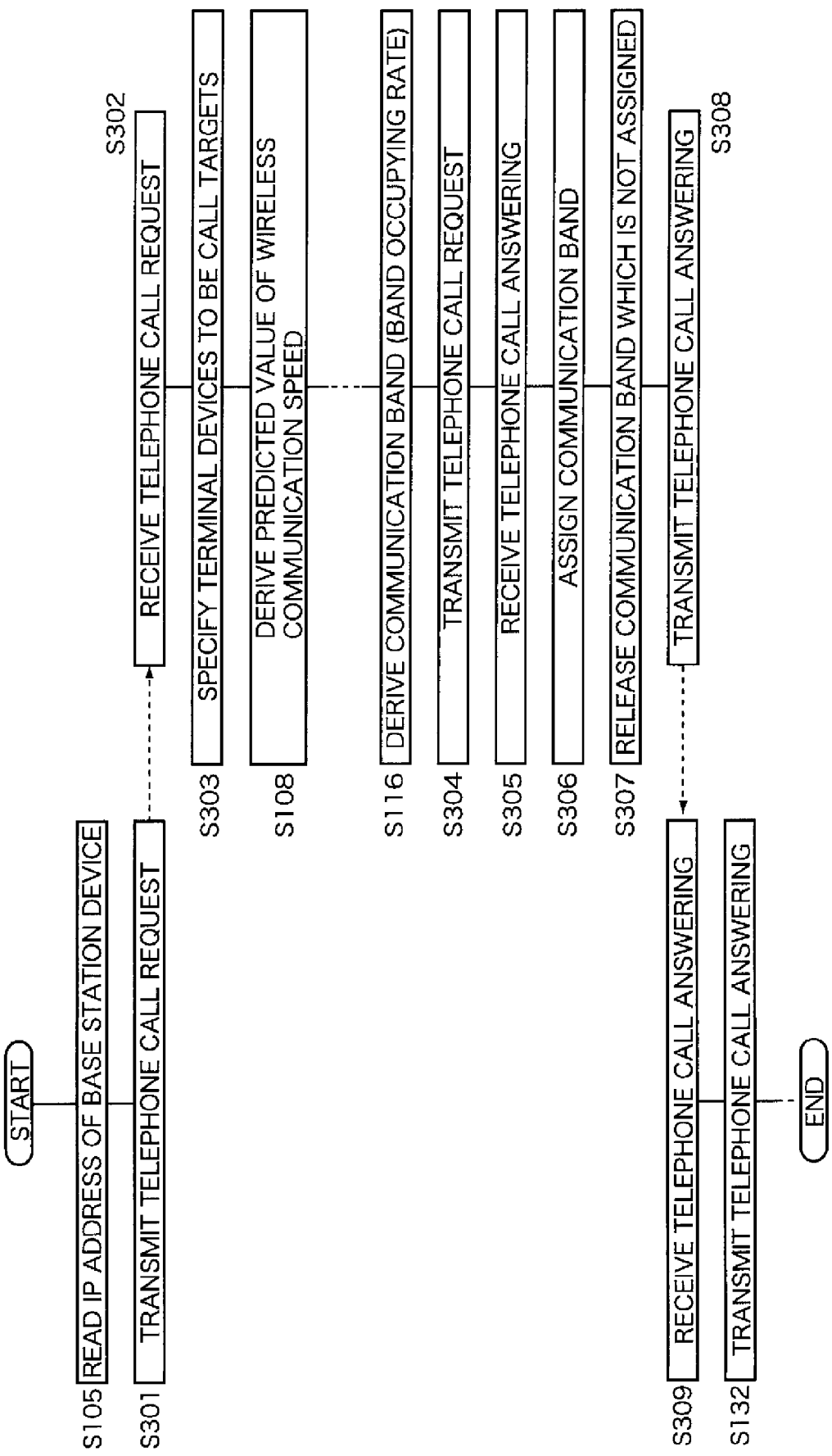
FIG. 22 is a flowchart showing an example of call connection establishment processing of a call control device and a base station device with which the communication system according to Embodiment 4 of the present application is provided.

Next, processing of each device with which the communication system according to Embodiment 4 of the present application is provided is described. FIG. 22 is a flowchart showing an example of call connection establishment processing of the call control device 1 and the base station device 2 with which the communication system according to Embodiment 4 of the present application is provided. The call control device 1 carries out, similar to the processing according to Steps S101 to S105 of the call connection establishment processing of Embodiment 1, processing from reception of the request of call connection to reading of the IP addresses of the grouped terminal devices 3, 3, . . . to be the targets of the call.

By control of the control unit 10 that executes the computer program 1000, the call control device 1 transmits a telephone call request for requesting call connection establishment from the communication unit 14 to the base station device 2 via the wired communication network 100 (S301). In the telephone call request, IP addresses which are specifying information of the plurality of terminal devices 3, 3, . . . to be call targets as targets of the call connection establishment, and a group ID according to a group incoming call are indicated. Note that, if there are a plurality of base station devices 2, the telephone call request is transmitted to all of the base station devices 2, 2, . . . .

By the control of the control unit 20 that executes the computer program 2000, the base station device 2 receives with the wired communication unit 24 the telephone call request from the wired communication network 100 (S302).

By processing of the call authentication control section 20d based on the control of the control unit 20, the base station device 2 specifies the terminal devices 3, 3, . . . to be call targets among the terminal devices 3, 3, . . . connected with the base station device 2 itself based on the IP addresses of the terminal devices 3, 3, . . . indicated in the telephone call request (S303). Note that the specified terminal devices 3, 3, . . . are administrated so as to be associated with the group ID indicated in the telephone call request in subsequent processing.

Then, the base station device 2 carries out processing from derivation of a predicted value of the wireless communication speed to recording of a secured communication band, similar to the processing according to Steps S108 to S116 of the call connection establishment processing of Embodiment 1.

By processing of the call authentication control section 20d based on the control of the control unit 20, the base station device 2 transmits a telephone call request for calling the terminal devices 3, 3, . . . from the wireless communication unit 25 to the terminal devices 3, 3, . . . via the wireless communication network 101 based on the IP addresses of the terminal devices 3, 3, . . . determined to be callable whose connection propriety flag is "1" (S304).

The terminal devices 3, 3, . . . corresponding to the IP addresses indicated in the telephone call request receive the telephone call request, and then carry out a call-in operation, such as ringing of a call sound. Then, by a user operating the terminal device 3 which is in the ringing state to answer it, the terminal device 3 transmits a 200OK packet to the base station device 2 via the wireless communication network 101 as a telephone call answering indicating that he/she answers the call.

By processing of the band assigning section 20c based on the control of the control unit 20, the base station device 2 receives with the wireless communication unit 25 the telephone call answering via the wireless communication network 101 (S305), then assigns a communication band to be occupied in the communication band secured as a reserved band to the terminal device 3 which is a transmission source of the telephone call answering (S306), and then releases a communication band which is not assigned in the secured communication band (S307). The base station device 2 then transmits from the wired communication unit 24 to the call control device 1 via the wired communication network 100 the telephone call answering as information indicating that a telephone call is possible by performing the assignment of the communication band, the cancellation of the reservation, and the release of the communication band (S308).

Then, by control of the control unit 10, the call control device 1 receives with the communication unit 14 the telephone call answering from the wired communication network 100 (S309), and then carries out processing for establishing call connection similar to the processing of Step S132 and subsequent processing of the call connection establishment processing according to Embodiment 1. Further, the call control device 1 notifies cancellation of the telephone call request to other terminal devices 3 to be targets of the other calls when establishing the call connection to the terminal device 3 answered the call. Note that, when there are a plurality of base station devices 2, the base station devices 2, 2, ... connected with the terminal devices 3, 3, ... to be the targets of the other calls release the communication band which is not assigned when receiving the notice of cancellation of the telephone call request, notify the cancellation of the telephone call request to the terminal devices 3, 3, ..., and then stop the ringing of the terminal devices 3, 3, .... Thus, the call connection establishment processing according to Embodiment 4 of the present application is carried out.

Embodiment 5

Embodiment 5 is a form of Embodiment 1 in which the wired communication band in the wired section is detected, and the band occupying rate is calculated with high precision. Because the configuration example of the communication system according to Embodiment 5 and the hardware configuration of each device with which the communication system is provided are similar to those of Embodiment 1, they are assigned with similar reference numerals to those of Embodiment 1, and thereby omitting their description.

Figure 23:
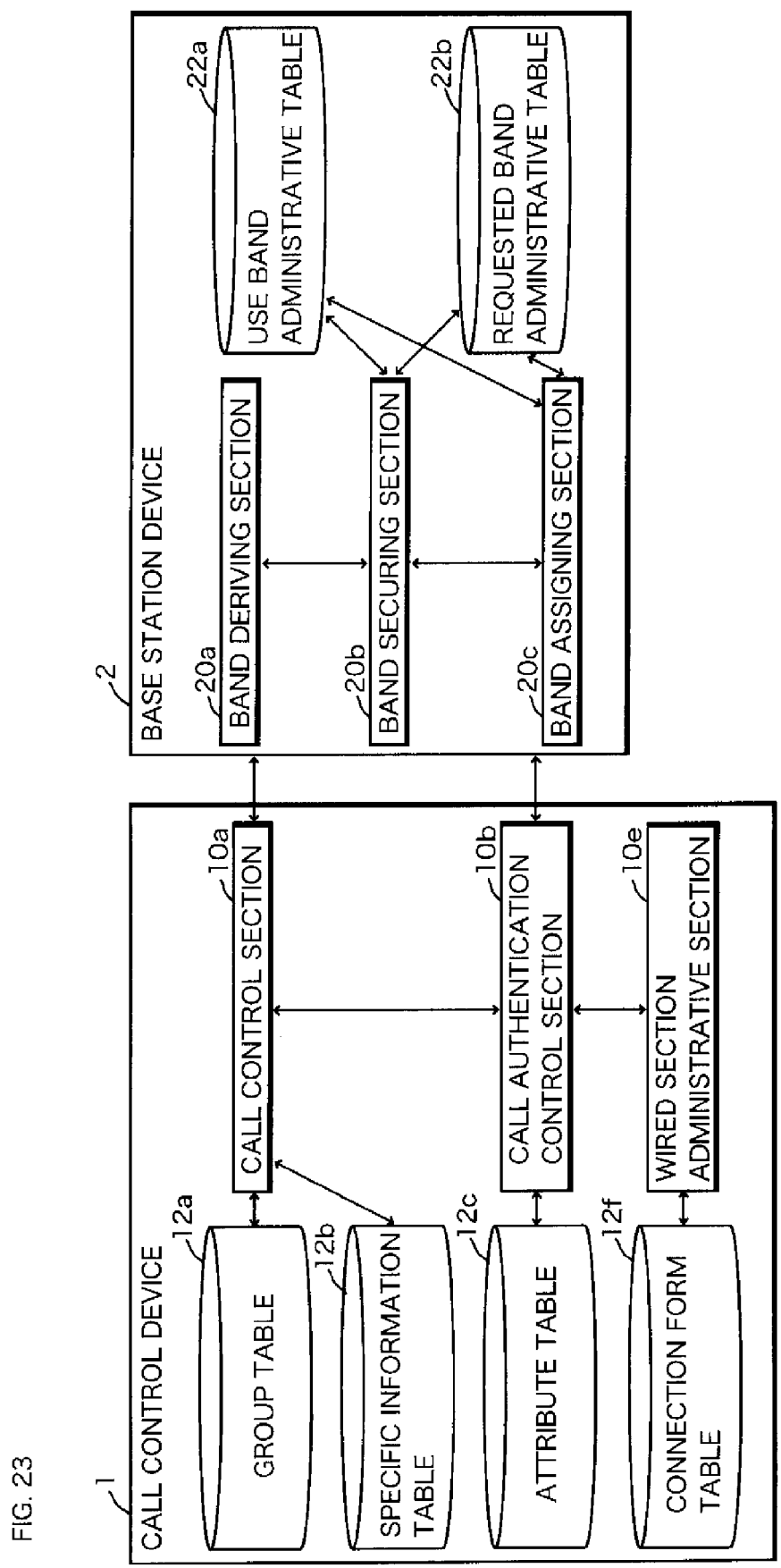
FIG. 23 is a functional block diagram showing an example of a function of each device with which a communication system according to Embodiment 5 of the present application is provided.

FIG. 23 is a functional block diagram showing an example of a function of each device with which the communication system according to Embodiment 5 of the present application is provided. The call control device 1 of the present application causes, by executing with the control unit 10 the various computer programs according to the call control of the computer program 1000 or the like for the call control device of the present application, the control unit 10 to function as various program modules, such as the call control section 10*a*, the call authentication control section 10*b*, and the wired section administrative section 10*e* for performing detection of a form of connection, such as CODEC, included in session information based on agreement, such as an SDP (Session Description Protocol) specified by the request of call connection, and determination of a wired communication band according to the detection result. Further, by executing with the control unit 10 the various computer programs according to the call control of the computer program 1000 or the like for the call control device of the present application, various tables, such as the group table 12*a*, the specifying information table 12*b*, the attribute table 12*c*, and the connection form table 12*f* for recording a variety of information specified in the form of connection included in the session information, are generated in a recording area of the recording unit 12.

Because the functional configurations of the base station device 2 of Embodiment 5 are similar to those of Embodiment 1 of the present application, they are given with similar reference numerals to those of Embodiment 1, and thereby omitting their description.

FIG. 24 is a diagram conceptually illustrating an example of recorded contents of the connection form table 12*f* with which the call control device 1 according to Embodiment 5 of the present application is provided. The connection form table 12*f* is a table indicating information defined by the agreement of RFC3551 or the like, and records per record with which the information, such as the number indicative of the form of connection, CODEC, type information, a wired communication band (one way), are associated. The type information is media information indicative of the type of communication, such as audio and video. The wired communication band (one way) is a band of one way used for communication in the wired section, and it is indicated as a required communication speed. In the request of call connection, the number indicating the form of connection as the session information is indicated. For example, if the form of connection is a number "0," CODEC is "PCMU," the type information is "audio," and the wired communication band (one way) is "64 kbps." Note that, in the present application, because it is based on two-way communication, when the wired communication band (one way) is "64 kbps," the required wired communication band will be 128 kbps.

Figure 25:
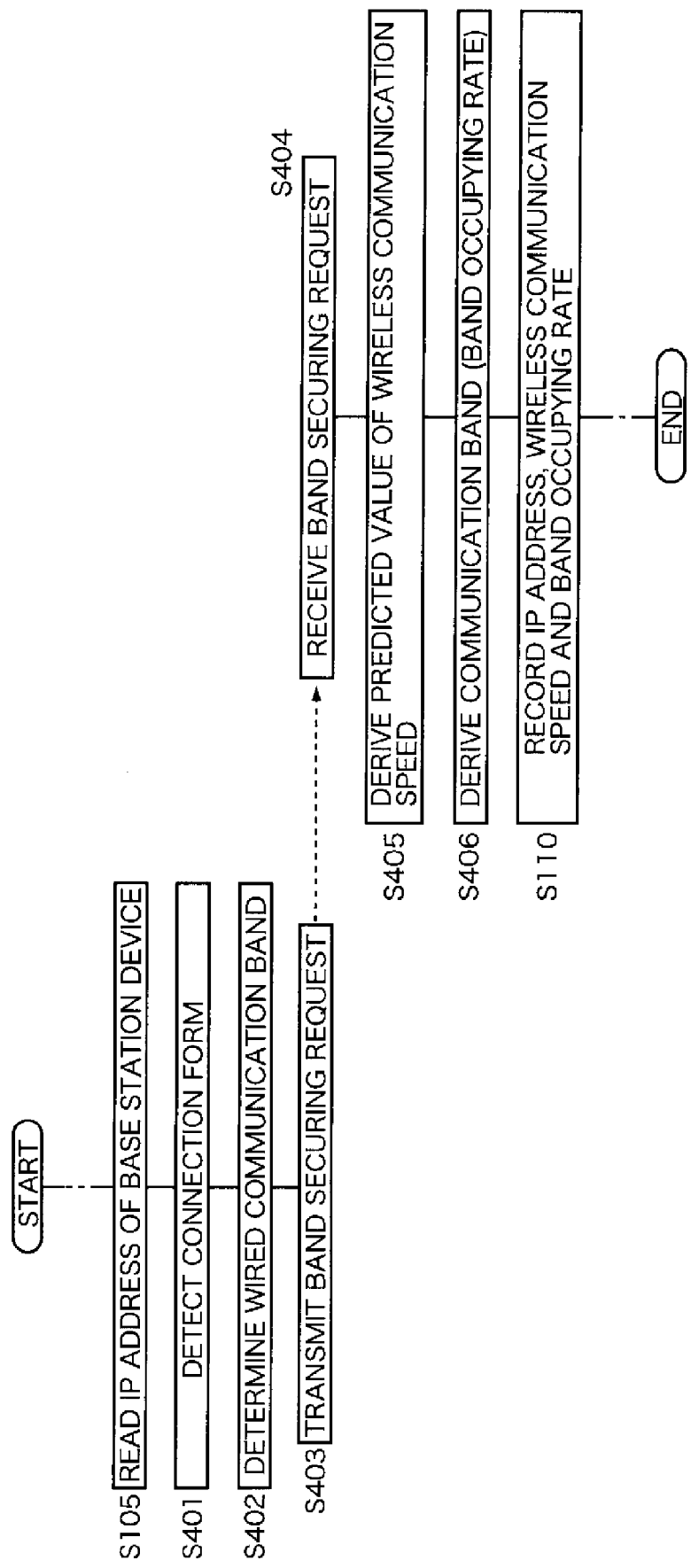
FIG. 25 is a flowchart showing an example of call connection establishment processing of the call control device and a base station device with which the communication system according to Embodiment 5 of the present application is provided.

Next, processing of each device with which the communication system according to Embodiment 5 of the present application is provided is described. FIG. 25 is a flowchart showing an example of call connection establishment processing of the call control device 1 and the base station device 2 with which the communication system according to Embodiment 5 of the present application is provided. The call control device 1 carries out processing from reception of a request of call connection to reading of an IP address of the base station device 2, similar to the processing according to Steps S101 to S105 of the call connection establishment processing of Embodiment 1.

By processing of the wired section administrative section 10*e* based on the control of the control unit 10 that executes the computer program 1000, the call control device 1 detects a form of connection by reading the session information indicative of the form of connection indicated in the request of call connection (S401), and then determines a wired communication band to be used for communication of a wired section of call connection based on the regulation according to the detected form of connection with reference to the connection form table 12*f* (S402). For example, if the session information is "m=audio 49170 RTP/AVP 0," "0" at the end is a number indicating the form of connection, and by referring to the connection form table 12*f* illustrated in FIG. 24, the wired communication band required for the two-way communication is determined to be "128 kbps." Note that, if a plurality of forms of connection are specified, it determines to be a wired communication band having the maximum width in each of the wired communication bands according to the specified form.

By processing of the call authentication control section 10*b* based on the control of the control unit 10, the call control device 1 transmits the band securing request for requesting securing of the band required for the call connection establishment from the communication unit 14 via the wired communication network 100 to the base station device 2 indicated by the read IP address (S403).

FIG. 26 is a diagram conceptually illustrating an example of information included in the band securing request transmitted from the call control device 1 according to Embodiment 5 of the present application. In the band securing request, IP addresses which is specifying information of a plurality of terminal devices 3, 3, . . . to be call targets as targets of the call connection establishment, a classification of the request, a group ID according to a group incoming call, and a wired communication band are indicated.

Returning to the flowchart of FIG. 25, by the control of the control unit 20 that executes the computer program 2000, the base station control device 2 receives with the wired communication unit 24 a band securing request from the wired communication network 100 (S404).

By processing of the band deriving section 20a based on the control of the control unit 20, the base station device 2 derives a predicted value of a wireless communication speed as a link rate according to communication in a wireless section at the time of the call connection establishment, for the plurality of terminal devices 3, 3, . . . to be call targets indicated in the band securing request (S405), and then derives a communication band (band occupying rate) required for the call connection of each of the terminal devices 3, 3, . . . to be call targets based on the predicted value of the wireless communication speed and the wired communication band indicated in the band securing request (S406). The communication band at Step S406 is derived by using Equation 1 according to Embodiment 1. Although, in Embodiment 1, as for the wired communication band, a value which is set in advance is used, an optimum communication band can be derived by using the wired communication band indicated in the band securing request in this embodiment.

Then, the base station device 2 and the call control device 1 carry out processing for establishing the call connection, similar to the processing of Step S110 and the subsequent processing of the call connection establishment processing of Embodiment 1. Thus, the call connection establishment processing according to Embodiment 5 is carried out.

Embodiment 6

Embodiment 6 is a form of Embodiment 5 in which, upon detection of the wired communication band in the wired section, a type of communication, such as video and audio, contained in the form of connection is detected, and by considering the detected type of communication, a band occupying rate is calculated with high precision. Because the configuration example of a communication system according to Embodiment 6 and a hardware configuration of each device with which the communication system is provided are similar to those of Embodiment 1, they are assigned with similar reference numerals to those of Embodiment 1, and thereby omitting their description.

Figure 27:
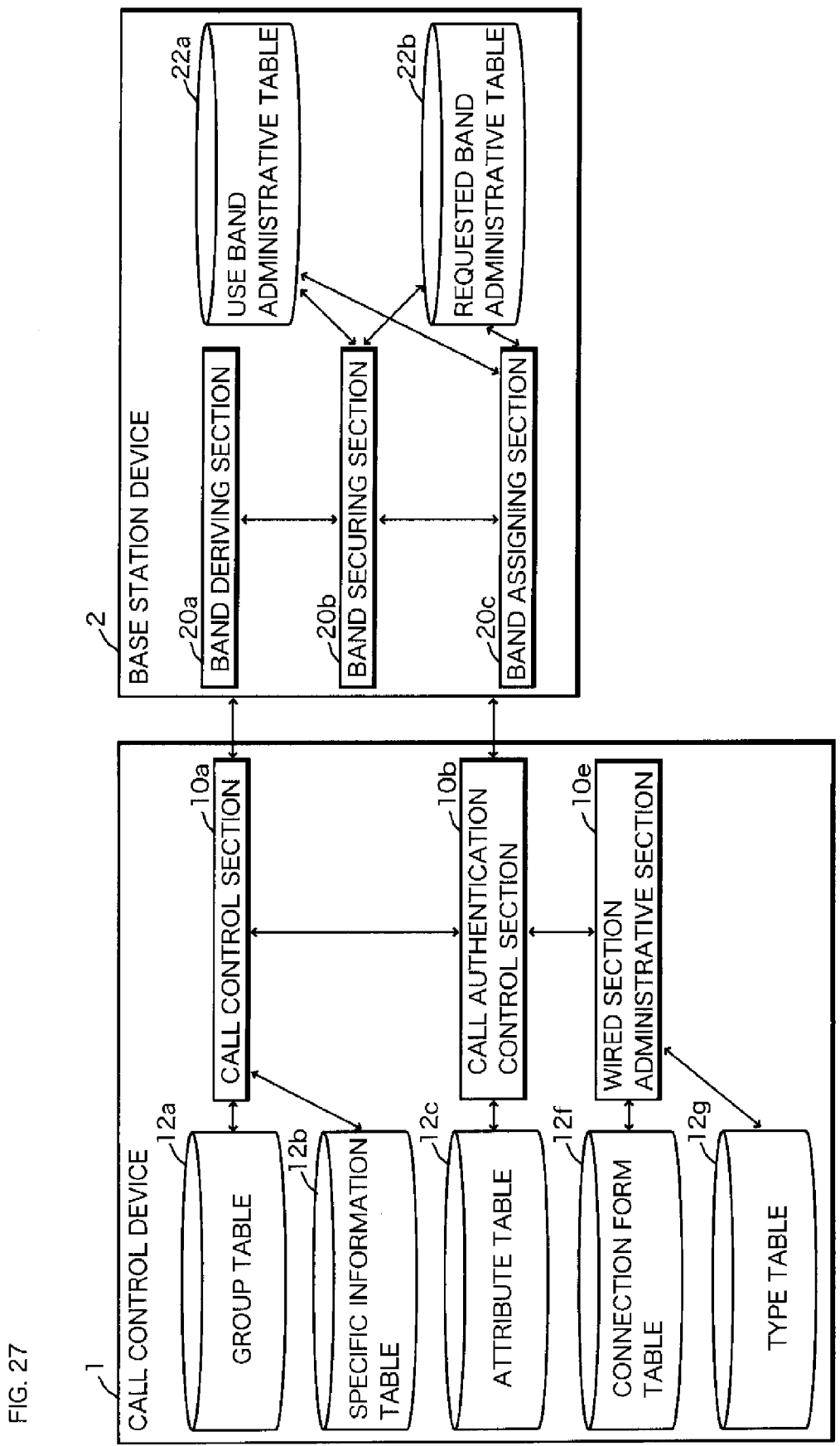
FIG. 27 is a functional block diagram showing an example of a function of each device with which a communication system according to Embodiment 6 of the present application is provided.

FIG. 27 is a functional block diagram showing an example of a function of each device with which the communication system according to Embodiment 6 of the present application is provided. The call control device 1 of the present application causes, by executing with the control unit 10 the various computer programs according to the call control of the computer program 1000 or the like for the call control device of the present application, the control unit 10 to function as various program modules, such as the call control section 10a, the call authentication control section 10b, and the wired section administrative section 10e. Further, by executing with the control unit 10 the various computer programs according to the call control of the computer program 1000 or the like for the call control device of the present application, various tables, such as the group table 12a, the specifying information table 12b, the attribute table 12c, the connection form table 12f, and the type table 12g for recording the type of communication which is adaptable by each of the terminal devices 3, 3, . . . , are generated in a recording area of the recording unit 12.

Because the functional configurations of the base station device 2 of Embodiment 6 of the present application are similar to those of Embodiment 1, they are given with similar reference numerals to those of Embodiment 1, and thereby omitting their description.

FIG. 28 is a diagram conceptually illustrating an example of recorded contents of the type table 12g with which the call control device 1 according to Embodiment 6 of the present application is provided. In the type table 12g, information indicative of the adaptable type of communication is recorded per record so as to be associated with the IP addresses which are specifying information for specifying the terminal devices 3, 3, . . . . For example, the terminal device 3 whose IP address is "192.168.1.100" is possible to carry out "audio" communication, and the terminal device 3 whose IP address is "192.168.1.101" is possible to carry out "video" communication, and the terminal device 3 whose IP address is "192.168.1.102" is possible to carry out both of the "audio" communication and the "video" communication.

Figure 29:
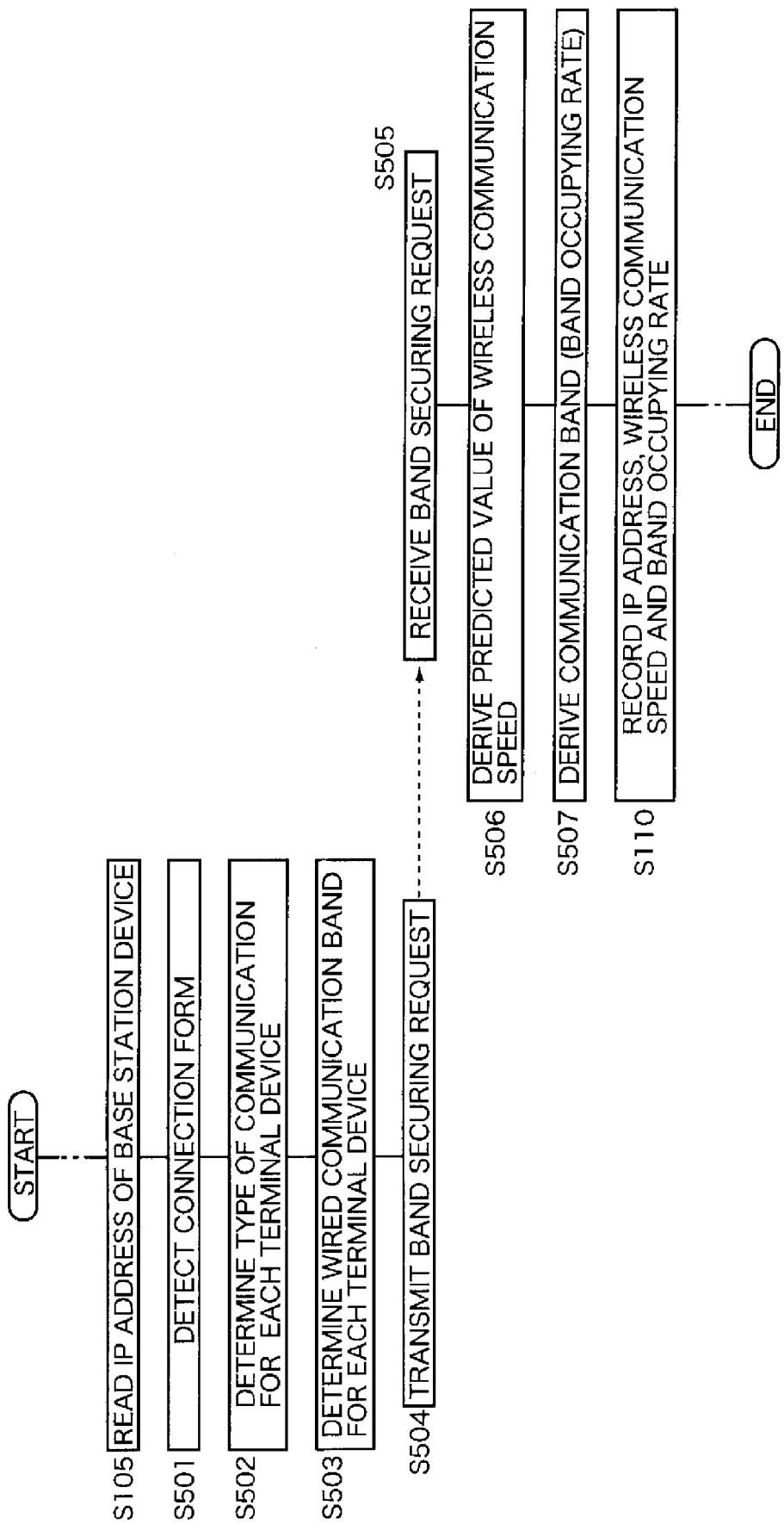
FIG. 29 is a flowchart showing an example of call connection establishment processing of the call control device and a base station device with which the communication system according to Embodiment 6 of the present application is provided.

Next, processing of each device with which the communication system according to Embodiment 6 of the present application is provided is described. FIG. 29 is a flowchart showing an example of call connection establishment processing of the call control device 1 and the base station device 2 with which the communication system according to Embodiment 6 of the present application is provided. The call control device 1 carries out processing from reception of request of call connection to reading of an IP address of the base station device 2, similar to the processing according to Steps S101 to S105 of the call connection establishment processing of Embodiment 1.

By processing of the wired section administrative section 10e based on the control of the control unit 10 that executes the computer program 1000, the call control device 1 detects a form of connection by reading session information indicative of the form of connection indicated in the request of call connection (S501). At Step S501, the one or more types of communication are detected as forms of connection. Here, subsequent description is given as "audio communication," "video communication," and "audio and video communication" being detected as the types of communication. As described in Embodiment 5, reading of a number indicative of the form of connection is also performed.

The call control device 1 determines a type of communication to be applied to each of the terminal devices 3, 3, . . . based on the type table 12g by processing of the wired section administrative section 10e based on the control of the control unit 10 (S502). If the type table 12g illustrated in FIG. 28 is used, the type of communication to be applied to the terminal device 3 which has 192.168.1.100" is determined to be "audio," the type of communication to be applied to the terminal device 3 whose IP address is "192.168.1.101" is determined to be "video," and the type of communication to be applied to the terminal device 3 whose which IP address is "192.168.1.102" is determined to be "audio" and "video." Note that, in Step S501, if the type of communication is only "audio," the terminal device 3 whose IP address is "192.168.1.101" is excluded from a target of the call connection, and it determines not to call.

By processing of the wired section administrative section 10e based on the control of the control unit 10, the call control device 1 determines a wired communication band to be used for communication in the wired section of the call connection for each of the terminal device 3, 3, . . . based on the regulation according to the detected form of connection with reference to the connection form table 12f (S503). At Step S503, a wired communication band corresponding to the type of communication determined at Step S502 is determined. For example, the wired communication band of the terminal device 3 whose type of communication is "audio" is determined to be "128 kbps," the wired communication band of the terminal device 3 whose type of communication is "video" is determined to be "640 kbps," and the wired communication band of the terminal device 3 whose types of communication are "audio" and "video" is determined to be "768 kbps." 768 kbps is the sum of 128 kbps and 640 kbps.

By processing of the call authentication control section 10b based on the control of the control unit 10, the call control device 1 transmits a band securing request for requesting securing of the band required for the call connection establishment from the communication unit 14 via the wired communication network 100 to the base station device 2 indicated by the read IP address (S504).

FIG. 30 is a diagram conceptually illustrating an example of information included in the band securing request transmitted from the call control device 1 according to Embodiment 6 of the present application. In the band securing request, IP addresses which is specifying information of the plurality of terminal devices 3, 3, . . . to be call targets as targets of the call connection establishment, a classification of the request, a group ID according to the group incoming call, and a wired communication band are indicated.

Returning to the flowchart of FIG. 29, by the control of the control unit 20 that executes the computer program 2000, the base station device 2 receives with the wired communication unit 24 the band securing request from the wired communication network 100 (S505).

By processing of the band deriving section 20a based on the control of the control unit 20, the base station device 2 derives, for the plurality of terminal devices 3, 3, . . . to be call targets indicated in the band securing request, predicted values of wireless communication speed as link rates according to communication in the wireless sections at the time of call connection establishment (S506), and based on the predicted values of the wireless communication speeds and the wired communication band indicated in the band securing request, a communication band (band occupying rate) required for the call connection of each of the terminal devices 3, 3, . . . to be call targets are derived (S507). The communication band at Step S507 is derived by using Equation 1 according to Embodiment 1. Although, in Embodiment 1, the value set in advance is used as the wired communication band, an optimum communication band can be derived in this embodiment by using the wired communication band determined for each of the terminal devices 3, 3, . . . indicated in the band securing request. For example, a band occupying rate indicative of the communication band of the terminal device 3 whose wireless communication speed is "11 Mbps," which only uses "audio" communication, and whose wired communication band is "128 kbps," will be 7.4%. A band occupying rate indicative of the communication band of the terminal device 3 whose wireless communication speed is "5.5 Mbps," which only uses "video" communication, and whose wired communication band is "640 kbps," will be 25.2%. A band occupying rate indicative of the communication band of the terminal device 3 whose wireless communication speed is "11 Mbps," which carries out "audio" and "audio" communication, and whose wired communication band is "768 kbps," will be 32.6%.

Then, the base station device 2 and the call control device 1 carry out processing for establishing the call connection similar to the processing of Step S110 and subsequent processing of the call connection establishment processing of Embodiment 1. Thus, the call connection establishment processing according to Embodiment 6 is carried out.

Embodiment 7

Embodiment 7 is a form of Embodiment 5 in which, when a plurality of forms which can be selected are detected by detection of a wired communication band in a wired section, a band occupying rate is calculated with high precision by deriving the communication band for every form of connection. Because the configuration example of the communication system according to Embodiment 7 and the hardware configuration of each device with which the communication system is provided are similar to those of Embodiment 1, they are assigned with similar reference numerals to those of Embodiment 1, and thereby omitting their description.

Because the functional configurations of the communication system according to Embodiment 7 are similar to those of Embodiment 5, they are assigned with similar reference numerals to those of Embodiment 5, and thereby omitting their description. However, because recorded contents of the requested band administrative table 22b differ from those of Embodiment 5, the requested band administrative table 22b is described. FIG. 31 is a diagram conceptually illustrating an example of the requested band administrative table 22b with which the base station device 2 according to Embodiment 7 of the present application is provided. The requested band administrative table 22b according to Embodiment 7 records per record including a wired communication band, a band occupying rate indicative of a communication band required for call connection of each of the terminal devices 3, 3, . . . , and a connection propriety flag indicative of the propriety of the call connection, which are associated with a group ID and IP addresses of the terminal devices 3, 3, . . . . In Embodiment 7, in order to derive a communication band for every form of connection, the form of connection (i.e., a communication band derived for every wired communication band) is recorded in the requested band administrative table 22b.

Figure 32:
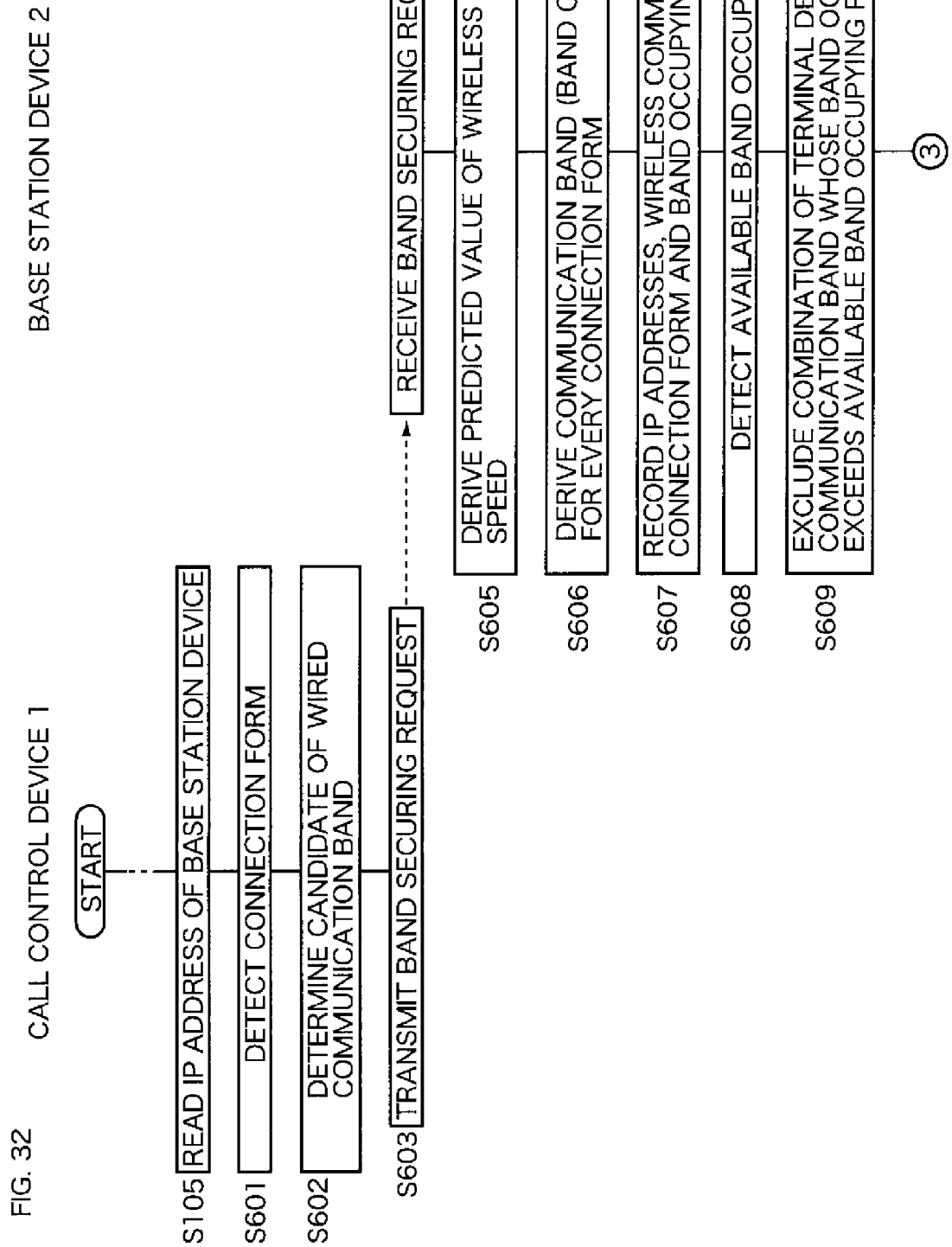
FIG. 32 is a flowchart showing an example of call connection establishment processing of a call control device and the base station device with which a communication system according to Embodiment 7 of the present application is provided.
Figure 33:
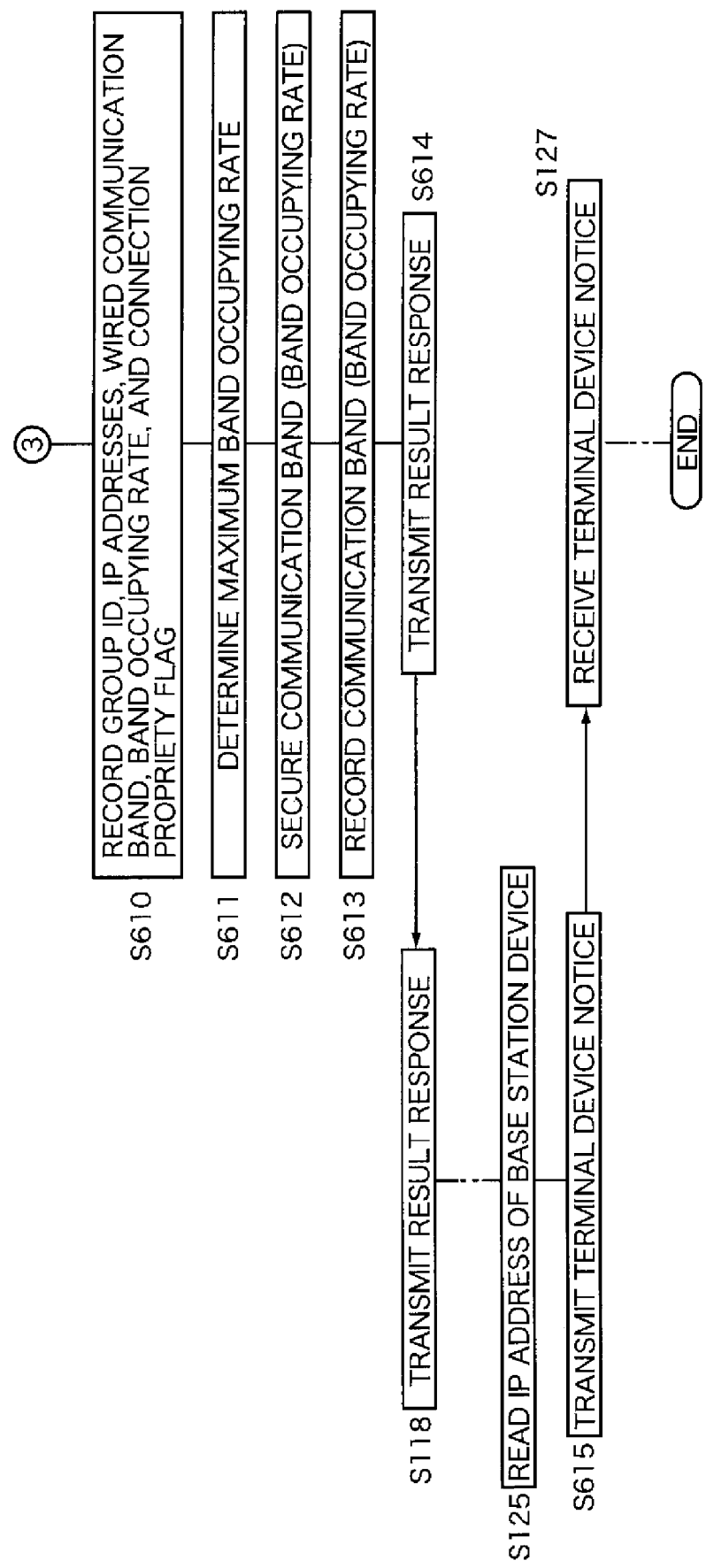
FIG. 33 is a flowchart showing an example of call connection establishment processing of the call control device and the base station device with which the communication system according to Embodiment 7 of the present application is provided.

Next, processing of each device with which the communication system according to Embodiment 7 of the present application is provided is described. FIGS. 32 and 33 is a flowchart showing an example of call connection establishment processing of the call control device 1 and the base station device 2 with which the communication system according to Embodiment 7 of the present application is provided. The call control device 1 carries out processing from reception of request of call connection to reading of an IP address of the base station device 2 similar to the processing according to Steps S101 to S105 of the call connection establishment processing of Embodiment 1.

By processing of the wired section administrative section 10e based on the control of the control unit 10 that executes the computer program 1000, the call control device 1 detects a form of connection by reading session information indicative of the form of connection indicated in the request of call connection (S601). When a plurality of forms of connection is detected, the call control device 1 determines a candidate of the wired communication band to be used for communication in the wired section of the call connection based on the regulation according to each detected form of connection with reference to the connection form table 12f (S602). For example, if the session information is "m=audio 49170 RTP/AVP 0 18," "0" and "18" at the end are numbers which indicate the forms of connection, and by referring to the connection form table 12f illustrated in FIG. 24 of Embodiment 5, the candidates of the wired communication band required for two-way communication are determined to be "128 kbps" corresponding to the number "0," and "16 kbps" corresponding to the number "18." Note that, if the number of the detected forms of the connection is one, subsequent processing is performed as Embodiment 5.

By processing of the call authentication control section 10b based on the control of the control unit 10, the call control device 1 transmits a band securing request for requesting securing of a band required for the call connection establishment from the communication unit 14 via the wired communication network 100 to the base station device 2 indicated by the read IP address (S603).

FIG. 34 is a diagram conceptually illustrating an example of information included in the band securing request transmitted from the call control device 1 according to Embodiment 7 of the present application. In the band securing request, IP addresses which are specifying information of the plurality of terminal devices 3, 3, . . . to be call targets as targets of call connection establishment, a classification of the request, and a group ID according to a group incoming call, and a plurality of candidates of the wired communication band are indicated.

Returning to the flowchart of FIGS. 32 and 33, by the control of the control unit 20 that executes the computer program 2000, the base station device 2 receives with the wired communication unit 24 the band securing request from the wired communication network 100 (S604).

By processing of the band deriving section 20a based on the control of the control unit 20, the base station device 2 derives, for the plurality of terminal devices 3, 3, . . . to be call targets indicated in the band securing request, a predicted value of a wireless communication speed as a link rate according to communication in the wireless section at the time of the call connection establishment (S605), and then derives a communication band (band occupying rate) required for the call connection of each of the terminal devices 3, 3, . . . to be the call targets for every form of connection (i.e., for every wired communication band) based on the predicted values of the wireless communication speed and each of the plurality of wired communication bands indicated in the band securing request (S606). The communication band at Step S605 is derived by using Equation 1 according to Embodiment 1. At Step S606, for each of the terminal devices 3, 3, . . . , a communication band when the wired communication band speed is 128 kbps, and a communication band when the wired communication band speed is 16 kbps are derived, for example. For example, as for the terminal device 3 whose wireless communication speed is "11 Mbps," a band occupying rate indicative of a communication band when the wired communication band is 128 kbps will be 7.4%, and when 16 kbps, it will be 5.2%. Further, as for the terminal device 3 whose wireless communication speed is "5.5 Mbps," a band occupying rate indicative of a communication band when a wired communication band is 128 kbps will be 9.3%, and when 16 kbps, it will be 5.4%. Further, as for the terminal device 3 whose wireless communication speed is "2 Mbps," a band occupying rate indicative of a communication band when a wired communication band is 128 kbps will be 15.6%, and when 16 kbps, it will be 6.0%.

By processing of the band deriving section 20a based on the control of the control unit 20, the base station device 2 stores the IP addresses of the terminal devices 3, 3, . . . to be call targets, the derived wireless communication speed, and the derived band occupying rate (communication band) of every form of connection (wired communication band) in the storing unit 23 so as to be associated with each other (S607).

By processing of the band securing section 20b based on the control of the control unit 20, the base station device 2 detects a band occupying rate which can be used based on the use band administrative table 22a (S608), then excludes a combination of the terminal devices 3, 3, . . . and the wired communication band (form of connection) whose band occupying rate stored at Step S607 exceeds the band occupying rate which can be used (communication band) from targets to be called to establish call connection (S609), and then records a group ID of the terminal devices 3, 3, . . . to be targets of the call, IP addresses of the terminal devices 3, 3, . . . , a wired communication band (form of connection), the derived band occupying rate, and a connection propriety flag in the requested band administrative table 22b (S610). If 90.0% of the communication band is already used and it is detected that the band occupying rate which can be used is 10% at Step S608, the combination of the terminal devices 3, 3, . . . and the wired communication band which require the band occupying rate exceeding 10% is excluded from the target of the call at Step S610. For example, in FIG. 31, as for the terminal device 3 whose IP address is "192.168.1.102," the connection propriety flag will be "0" and the terminal device 3 is excluded from the target of the call when the wired communication band whose band occupying rate is "15.6%" is "128 kbps." However, even for the terminal device 3 concerned, if the wired communication band is "16 kbps," because the band occupying rate will be "6.0%," it will be the target of the call.

By processing of the band securing section 20b based on the control of the control unit 20, the base station device 2 determines a band occupying rate which requires the communication band having the maximum width in each band occupying rate of the terminal devices 3, 3, . . . other than the excluded combination of the terminal devices 3, 3, . . . and the wired communication band with reference to the requested band administrative table 22b (S611), then secures the determined maximum communication band (band occupying rate) as a reserved band in the communication band which can be used (S612), and then records the secured communication band (band occupying rate) in the use band administrative table 22a so as to be associated with the group ID (S613). For example, in the case of FIG. 31, the band occupying rate indicative of the communication band having the maximum width will be "9.3%."

Then, by the control of the control unit 20, the base station device 2 transmits a resulted response to the band securing request from the wired communication unit 24 to the call control device 1 via the wired communication network 100 (S614).

FIG. 35 is a diagram conceptually illustrating an example of information included in the resulted response transmitted from the base station device 2 according to Embodiment 8 of the present application. In the resulted response, IP addresses of the terminal devices 3, 3, . . . corresponding to the group . . . ID and a propriety of the call for every wired communication band are indicated. In the example shown in FIG. 35, the terminal devices 3 and 3 whose IP addresses are "192.168.1.100" and "192.168.1.101" are possible for a call based on call connection according to a wired communication band of "128 kbps," and the terminal device 3 whose IP address is "192.168.1.102" is possible for a call based on call connection according to a wired communication band of "16 kbps." Note that, if a single terminal device 3 is adaptable to a plurality of wired communication bands, a wired communication band having the maximum width may be notified as a resulted response for the terminal device 3 concerned to establish a high-quality call connection.

Returning to the flowchart of FIGS. 32 and 33, the call control device 1 carries out processing from reception of the resulted response to reading of the IP address of the base station device 2 similar to the processing according to Steps S118 to S125 of the call connection establishment processing of Embodiment 1. However, if a plurality of wired communication bands are associated with the terminal device 3 for which call connection is to be established, the wired communication band having the maximum width is selected.

By processing of the call authentication control section 10b based on the control of the control unit 10, the call control device 1 transmits the IP address and the group ID of the terminal device 3 which establishes call connection and a terminal device notice for notifying the form of connection indicating the wired communication band from the communication unit 14 via the wired communication network 100 to the base station device 2 indicated by the read IP address (S615).

Then, the base station device 2 and the call control device 1 carry out processing for establishing call connection similar to the processing of Step S127 and subsequent processing of the call connection establishment processing of Embodiment 1. Note that the form of call connection established will differ in every terminal device 3, 3, . . . which establish connection. Thus, the call connection establishment processing according to Embodiment 7 is carried out.

Embodiment 8

Embodiment 8 is a form of Embodiment 1 in which, when a communication band required for call connection of a terminal device to be called is large and other predetermined conditions set suitably are satisfied, the terminal device concerned is excluded from a target of the call. Because the configuration example of the system according to Embodiment 7 and the hardware configuration of each device with which the communication system is provided are similar to those of Embodiment 1, they are assigned with similar reference numerals to those of Embodiment 1, and thereby omitting their description.

Figure 36:
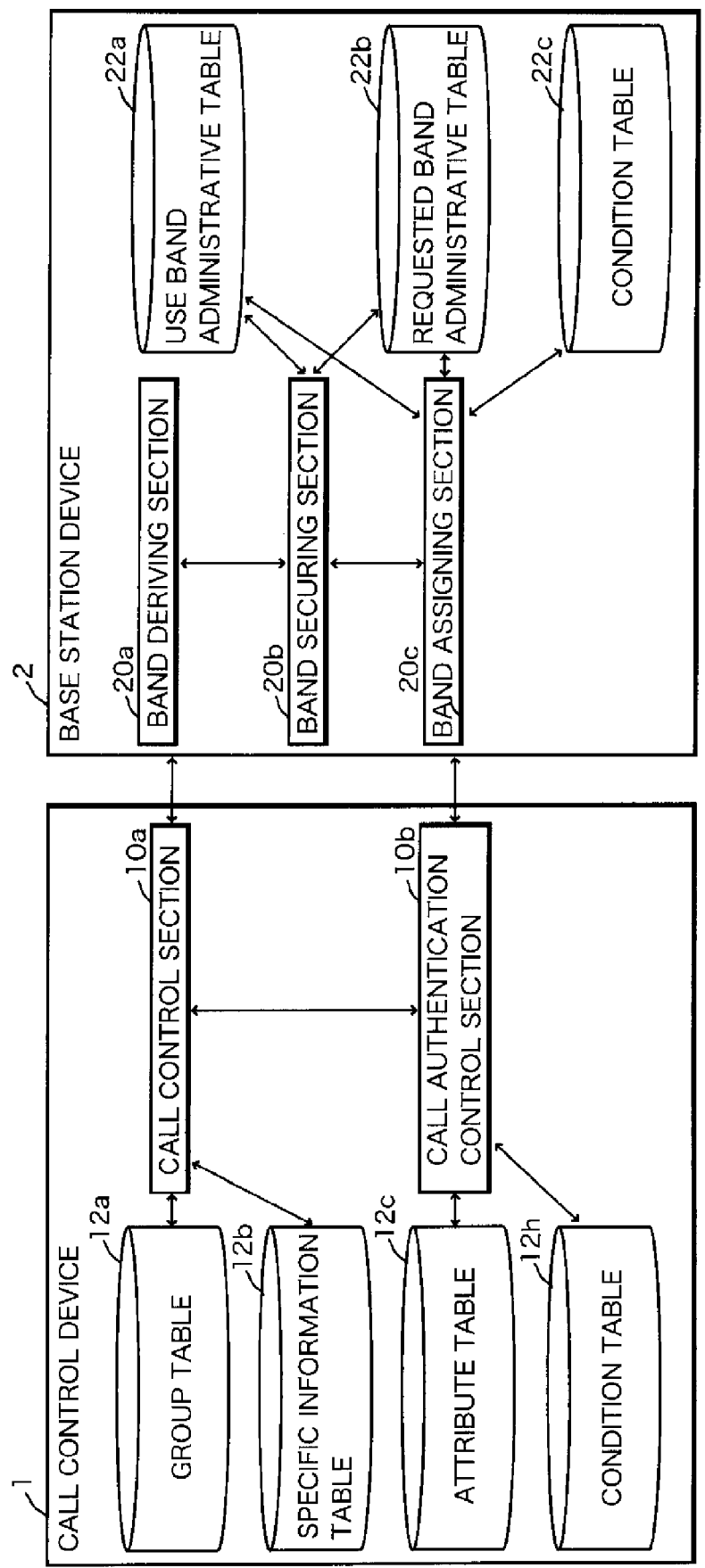
FIG. 36 is a functional block diagram showing an example of a function of each device with which a communication system according to Embodiment 8 of the present application is provided.

FIG. 36 is a functional block diagram showing an example of a function of each device with which the communication system according to Embodiment 8 of the present application is provided. By executing with the control unit 10 the various computer programs according to the call control of the computer program 1000 or the like for the call control device of the present application, the call control device 1 of the present application causes the control unit 10 to function as various program modules, such as the call control section 10a and the call authentication control section 10b. Further, by executing with the control unit 10 the various computer programs according to the call control of the computer program 1000 or the like for the call control device of the present application, various tables, such as the group table 12a, the specifying information table 12b, and a condition table 12h for recording call conditions (policies) of the terminal devices 3, 3, . . . are generated in a recording area of the recording unit 12.

By executing the various computer programs of the computer program 2000 or the like for the base station device of the present application with the control unit 20, the base station device 2 of the present application causes the control unit 20 to function as various program modules, such as the band deriving section 20a, the band securing section 20b, and the band assigning section 20c. Further, the base station device 2 of the present application generates, by executing with the control unit 20 the various computer programs of the computer program 2000 or the like for the base station device of the present application, various tables, such as the use band administrative table 22a, the requested band administrative table 22b, and the condition table 22c for recording call conditions (policies) of the terminal devices 3, 3, . . . in a recording area of the recording unit 22.

In subsequent description, as the call conditions of the terminal devices 3, 3, . . . , conditions are assumed to be set in which, when a band occupying rate according to a communication band required for call connection establishment of the terminal device 3 to be a target of determination is a predetermined value (here, 20% or more) and the call connection of the terminal device 3 to be the target of the determination is established with the band occupying rate, the communication band which can be used is reduced by a predetermined value (here, 50% or more (halved)), and when the number of the terminal devices 3, 3, . . . to be the targets of the call are a predetermined value (here, three or more), the terminal device 3 to be the target of the determination is excluded from the target of the call based on the call connection establishment. That is, it is the conditions in which, when there are three or more terminal devices 3, 3, . . . which can answer the call, the call connection establishment of the terminal device 3 which remarkably consumes the communication band is inhibited. When such conditions are set, conditions related to changes in the band occupying rate and the communication band which can be used are recorded in the condition table 22c with which the base station device 2 is provided, and the conditions related to the number of the terminal devices 3 are recorded in the condition table 12h with which the call control device 1 is provided. Note that, depending on the conditions, only one device of the call control device 1 and the base station device 2 may have the condition table.

Figure 37:
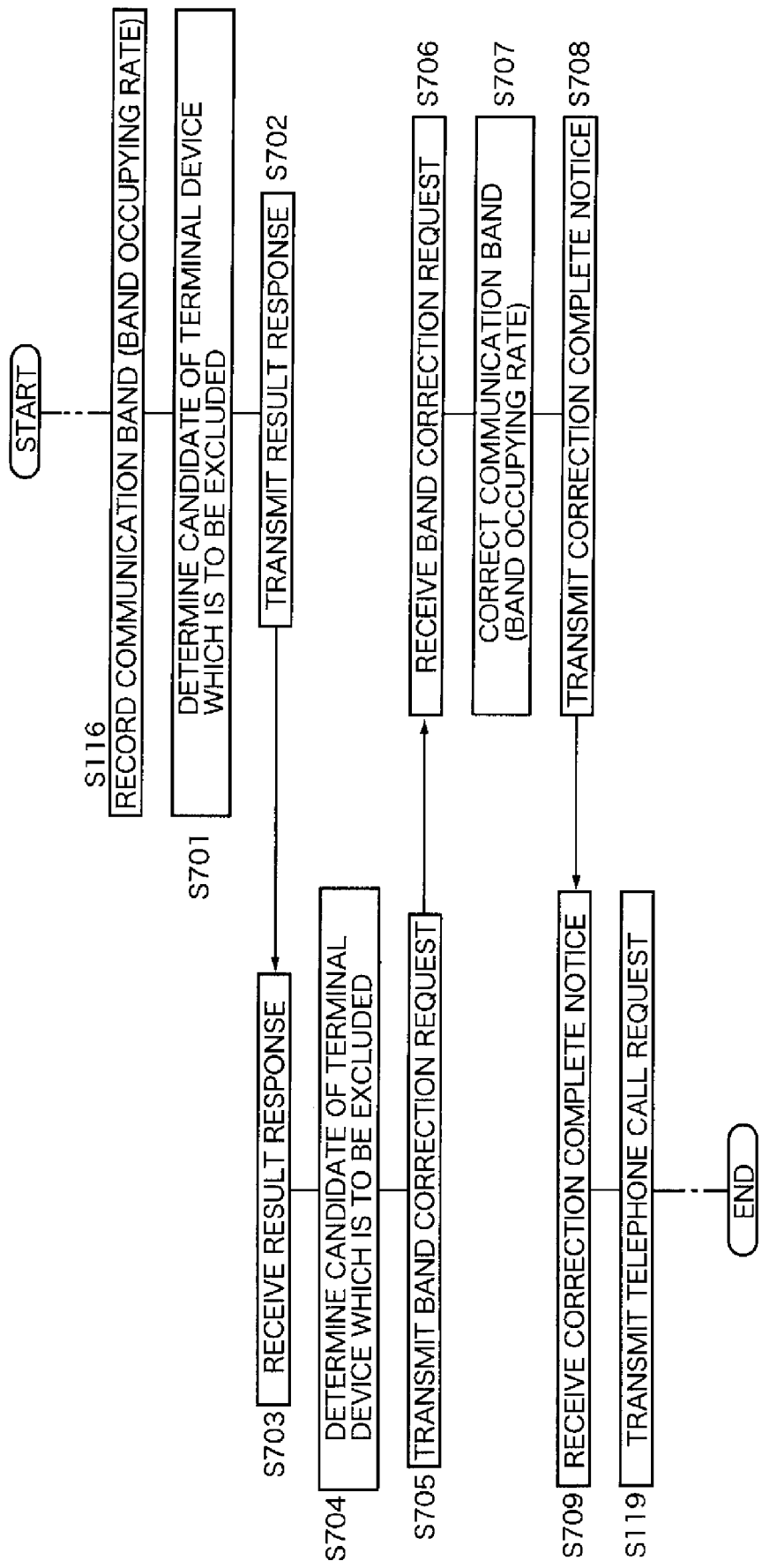
FIG. 37 is a flowchart showing an example of call connection processing of a call control device and the base station device with which the communication system according to Embodiment 8 of the present application is provided.

Next, processing of each device with which the communication system according to Embodiment 8 of the present application is provided is described. FIG. 37 is a flowchart showing an example of the call connection processing of the call control device 1 and the base station device 2 with which the communication system according to Embodiment 8 of the present application is provided. The call control device 1 carries out processing from reception of request of call connection to recording of a communication band similar to the processing according to Steps S101 to S116 of the call connection establishment processing of Embodiment 1.

By processing of the band securing section 20b based on the control of the control unit 20 that executes the computer program 2000, the base station device 2 determines a terminal device 3 to be a candidate which is to be excluded from a target of the call with reference to the condition table 22c (S701). Because the terminal devices 3, 3, . . . whose communication band required for the call connection establishment exceeding the communication band which can be used is excluded by the processing up to Step S115, at Step S701, the base station device 2 determines, for each of the terminal devices 3, 3, . . . which are not excluded by the processing up to Step S115, whether the band occupying rate recorded in the requested band administrative table 22b is 20% or more, and the band occupying rate which can be used is to be reduced by 50% or more (halved), and carry out the processing to determine the terminal devices 3, 3, . . . satisfying the conditions concerned as candidates of exclusion. Note that, if the terminal devices 3, 3, . . . satisfying the conditions concerned do not exist, it determines that no terminal device 3 to be the target of specifying does not exist as the result of Step S701. In such a case, subsequent processing will be similar to that of the processing of Step S116 and subsequent processing of Embodiment 1. For example, if the number of the terminal devices 3, 3, ... to be the targets of the call are three, the band occupying rates are 7.4%, 9.3%, and 25.6%, respectively, and the communication band which can be used is 44.6%, because the terminal device 3 whose band occupying rate is 25.6% has a band occupying rate of 20% or more, the band occupying rate which can be used is reduced by 50% or more (i.e., 22.3% or less), it is determined to be a candidate of the exclusion. Note that, because it is only a candidate of the exclusion in this stage, securing of the band occupying rate is 25.6%.

Then, by the control of the control unit 20, the base station device 2 transmits a resulted response the band securing request from the wired communication unit 24 to the call control device 1 via the wired communication network 100 (S702).

FIG. 38 is a diagram conceptually illustrating an example of information included in the resulted response transmitted from the base station device 2 according to Embodiment 8 of the present application. In the resulted response, IP addresses of the terminal devices 3, 3, ... corresponding to a group ID and the propriety of the call are indicated. In the example shown in FIG. 38, it is shown that the terminal devices 3, 3, ... whose IP addresses are "192.168.1.100" and "192.168.1.101" are callable, and the terminal device 3 whose IP address is "192.168.1.102" is an exclusion candidate. The exclusion candidate indicates the terminal device 3 is callable, but it is a target of exclusion of the call depending on the conditions determined by the call control device 1.

Returning to the flowchart of FIG. 37, by processing of the call authentication control section 10b based on the control of the control unit 10 that executes the computer program 1000, the call control device 1 receives with the communication unit 14 the resulted response from the wired communication network 100 (S703), determines whether the terminal devices 3, 3, ... to be candidates of the exclusion of the call are indicated in the resulted response, and if it determines that the target terminal devices 3, 3, ... to be candidates of the exclusion of the call are indicated, it determines the terminal devices 3, 3, ... to be excluded from the targets of the call among the terminal devices 3, 3, ... to be candidates of the call with reference to the condition table 12h (S704). At Step S704, the call control device 1 determines whether the number of the terminal devices 3, 3, ... to be the candidates of the call are three or more, and if determined to be three or more, it excludes the terminal devices 3, 3, ... which are the candidates of the exclusion of the call from the targets of the call. Here, subsequent description is given assuming that the number of the terminal devices 3, 3, and 3 to be the candidates of the call is three, and the terminal device 3 which is the candidate of the exclusion of the call is excluded from the targets of the call. Note that, if the terminal devices 3, 3, ... to be the targets of the exclusion of the call are not indicated in the resulted response, or if the number of the terminal devices 3, 3, ... to be the candidates of the call are less than three, processing of Step S119 and subsequent processing of Embodiment 1 are carried out. Further, by excluding from the targets of the call, if the terminal device 3 to be a candidate of the call no longer exists, suitable condition settings can be carried out, such as setting the terminal device 3 whose band occupying rate is the minimum to the candidate of the call.

By processing of the call authentication control section 10b based on the control of the control unit 10, the call control device 1 notifies that the terminal device 3 which was the candidate of the exclusion of the call is excluded from the targets of the call, and transmits a band correction request for requiring correction of the secured communication band from the communication unit 14 to the base station device 2 via the wired communication network 100 (S705).

By processing of the band securing section 20b based on the control of the control unit 20, the base station device 2 receives with the wired communication unit 24 the band correction request via the wired communication network 100 (S706), and then corrects the communication band recorded in the use band administrative table 22a according to the received band correction request (S707). For example, if the number of the terminal devices 3, 3, ... to be the targets of the call is three, and their band occupying rates are 7.4%, 9.3%, and 25.6%, respectively, and if 25.6% of the communication band is secured, the base station device 2 corrects the communication band to be secured from 25.6% to 9.3% which has the next largest band width.

Then, by the control of the control unit 20, the base station device 2 transmits a correction completed notice indicating that the correction to the band correction request is completed from the wired communication unit 24 to the call control device 1 via the wired communication network 100 (S708).

By processing of the call authentication control section 10b based on the control of the control unit 10, the call control device 1 then receives with the communication unit 14 the correction completed notice from the wired communication network 100 (S709).

Then, the base station device 2 and the call control device 1 carry out processing for establishing the call connection similar to the processing of Step S119 and subsequent processing of the call connection establishment processing of Embodiment 1. Thus, the call connection establishment processing according to Embodiment 8 is carried out.

The embodiment described above is merely an example of the infinite number of forms of the present application, and may be developed in various forms. Further, Embodiments 1 through 8 described above may not be an independent form from each other, but may be combined suitably.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification related to a showing of the superiority and inferiority of the invention. Although the embodiments of the present inventions have been described in detail, it should be understood that the various changes, substitutions, and alternations could be made hereto without departing from the spirit and scope of the invention.

What is claimed is:

1. A communication system for calling a plurality of terminal devices in response to a single request of call connection, assigning, for a single terminal device which answered the call, a communication band to be occupied in a communication band which can be used, and establishing the call connection in the assigned communication band, the communication system comprising:

a first deriving section that derives a communication band required for the call connection of each of the terminal devices to be called when the request of call connection is received;

a securing section that secures a communication band having the maximum width in each of the derived communication bands in the communication band which can be used; and an assigning section that assigns a communication band to be occupied in the secured communication band to the terminal device which answered the call, wherein the communication system is constituted such that it establishes the call connection in a set form of connection, the communication system further comprising:
a wired communication section and a wireless communication section;
a detection section that detects a form of connection specified by the request of call connection;
a determination section that determines a wired communication band to be used for communication in a wired section of the call connection based on regulation according to the detected form of connection; and
a second deriving section that derives predicted values of speed of communication in the wireless communication section with a plurality of terminal devices to be call targets at the time of a call connection establishment;
wherein the first deriving section is constituted such that it derives a communication band required for the call connection with each of the terminal devices based on the wired communication band and the derived predicted value of the speed of communication, using an equation:
Band occupying rate=control band+(wired communication band/wireless communication speed)×constant.

2. The communication system according to claim 1, further comprising a call control device that controls the call connection;
wherein the call control device includes the wired communication section, the securing section and the assigning section.

3. The communication system according to claim 1, further comprising a base station device that carries out wireless communication according to the call connection with the terminal device;
wherein the base station device includes the wireless communication section, the deriving section, the securing section, and the assigning section.

4. A communication system including a call control device for calling a plurality of terminal devices in response to a single request of call connection, and establishing the call connection of a single terminal device which answered the call, a base station device for carrying out wireless communication according to the call connection with the terminal device to which a communication band to be occupied is assigned in a communication band which can be used, the communication system comprising:
a first deriving section that derives a communication band required for the call connection of each of the terminal devices to be called when the request of call connection is received;
a securing section that secures a communication band having the maximum width in each of the derived communication bands in the communication band which can be used; and
an assigning section that assigns a communication band to be occupied in the secured communication band to the terminal device which answered the call,
wherein the communication system is constituted such that it establishes the call connection in a set form of connection, the communication system further comprising:
a wired communication section and a wireless communication section;
a detection section that detects a form of connection specified by the request of call connection;
a determination section that determines a wired communication band to be used for communication in a wired section of the call connection based on regulation according to the detected form of connection; and
a second deriving section that derives predicted values of speed of communication in the wireless communication section with a plurality of terminal devices to be call targets at the time of a call connection establishment;
wherein the first deriving section is constituted such that it derives a communication band required for the call connection with each of the terminal devices based on the wired communication band and the derived predicted value of the speed of communication, using an equation:
Band occupying rate=control band+(wired communication band/wireless communication speed)×constant.

5. The communication system according to claim 4, wherein the call control device is constituted such that it calls a terminal device according to a plurality of base station devices in response to the request of call connection; and
the securing section is constituted such that it secures, for each of the base station devices, the maximum communication band in a communication band according to the terminal device for carrying out the wireless communication.

6. The communication system according to any one of claims 1 to 5, further comprising an excluding section that excludes a terminal device whose communication band derived by the deriving section exceeding the communication band which can be used from targets for which the call connection is established.

7. The communication system according to claim 1, further comprising a releasing section that releases a communication band which is not assigned by the assigning section in the communication band secured by the securing section.

8. The communication system according to claim 1, further comprising an excluding section that excludes a terminal device whose communication band derived by the first deriving section is greater than a predetermined value from targets for which the call connection is established, when the number of the terminal devices to be targets of the call and the communication band which can be used satisfy predetermined conditions.

9. The communication system according to claim 1, wherein the communication system is constituted such that it establishes the call connection for mediating a set type of communication; wherein
the communication system further comprising a type table for recording an adaptable type of communication so as to be associated with each of the terminal devices;
the first detection section is constituted such that it detects one or more types of communication as the forms of connection;
the determination section is constituted such that it determines a wired communication band corresponding to the type; and
the deriving section is constituted such that it derives a communication band required for the call connection with each of the terminal devices based on a correspondence relation between the terminal device and the type of communication which are recorded in the type table, and the wired communication band corresponding to the type.

10. The communication system according to claim 1, wherein the first detection section is constituted such that it detects a plurality of forms of connection which can be selected and whose specified wired communication bands differ; and
wherein the deriving section is constituted such that it derives a communication band required for the call connection with each of the terminal devices for every form of connection.

11. A call control device for calling a plurality of terminal devices in response to a single request of call connection, and establishing, for a single terminal device which answered the call, the call connection in a communication band assigned in a communication band which can be used, the call control device comprising:
- a first deriving section that derives a communication band required for the call connection of each of the terminal devices to be called when the request of call connection is received;
- a securing section that secures a communication band having the maximum width in each of the derived communication bands in the communication band which can be used; and
- an assigning section that assigns a communication band to be occupied in the secured communication band to the terminal device which answered the call,
- wherein the call control device is constituted such that it establishes the call connection in a set form of connection, the call control device further comprising:
- a wired communication section and a wireless communication section;
- a detection section that detects a form of connection specified by the request of call connection;
- a determination section that determines a wired communication band to be used for communication in a wired section of the call connection based on regulation according to the detected form of connection; and
- a second deriving section that derives predicted values of speed of communication in the wireless communication section with a plurality of terminal devices to be call targets at the time of a call connection establishment;
- wherein the first deriving section is constituted such that it derives a communication band required for the call connection with each of the terminal devices based on the wired communication band and the derived predicted value of the speed of communication, using an equation: Band occupying rate=control band+(wired communication band/wireless communication speed)×constant.

12. A base station device for carrying out wireless communication by assigning a communication band to be occupied in a communication band which can be used, with a single terminal device which established connection in response to the call among a plurality of terminals called in response to a request of call connection, the base station device comprising:
- when the request of call connection is received,
- a first deriving section that derives a communication band required for the call connection of each of the terminal devices to be called;
- a securing section that secures a communication band having the maximum width in each of the derived communication bands in the communication band which can be used; and
- an assigning section that assigns a communication band to be occupied in the secured communication band to the terminal device which answered the call,
- wherein the base station device is constituted such that it establishes the call connection in a set form of connection, the base station device further comprising:
- a wired communication section and a wireless communication section;
- a detection section that detects a form of connection specified by the request of call connection;
- a determination section that determines a wired communication band to be used for communication in a wired section of the call connection based on regulation according to the detected form of connection; and
- a second deriving section that derives predicted values of speed of communication with a plurality of the terminal devices to be call targets at the time of a call connection establishment;
- wherein the first deriving section is constituted such that it derives a communication band required for the call connection with each of the terminal devices based on the wired communication band and the derived predicted value of the speed of communication, using an equation: Band occupying rate=control band+(wired communication band/wireless communication speed)×constant.

13. A computer readable recording medium storing a computer program causing a computer to execute processing according to call connection, the computer calling a plurality of terminal devices in response to a single request of the call connection, and establishing, for a single terminal device which answered the call, the call connection in a communication band assigned in a communication band which can be used, the computer program comprising:
- causing the computer to derive a communication band required for the call connection of each of the terminal devices to be called when the request of call connection is received;
- causing the computer to secure a communication band having the maximum width in each of the derived communication bands in the communication band which can be used; and
- causing the computer to assign a communication band to be occupied in the secured communication band to the terminal device which answered the call,
- wherein the computer program further causes the computer to establish the call connection in a set form of connection, the computer program further comprising:
- causing the computer to detect a form of connection specified by the request of call connection;
- causing the computer to determine a wired communication band to be used for communication in a wired section of the call connection based on regulation according to the detected form of connection; and
- causing the computer to derive predicted values of speed of communication with a plurality of the terminal devices to be called targets at the time of a call connection establishment;
- wherein the derived communication band required for the call connection with each of the terminal devices is derived based on based on the wired communication band and the derived predicted value of the speed of communication, using an equation: Band occupying rate=control band+(wired communication band/wireless communication speed)×constant.

14. A computer readable recording medium storing a computer program causing a computer to execute processing according to call connection, the computer carrying out wireless communication according to the call connection by assigning a communication band to be occupied in a communication band which can be used, with a single terminal device which established connection in response to a call among a plurality of terminals called in response to a single request of call connection, the computer program comprising:
- causing the computer to derive a communication band required for the call connection of each of the terminal devices to be called when the request of call connection is received;

causing the computer to secure a communication band having the maximum width in each of the derived communication bands in a communication band which can be used; and causing the computer to assign a communication band to be occupied in the secured communication band to the terminal device which answered the call, wherein the computer program further causes the computer to establish the call connection in a set form of connection, the computer program further comprising:

causing the computer to detect a form of connection specified by the request of call connection;

causing the computer to determine a wired communication band to be used for communication in a wired section of the call connection based on regulation according to the detected form of connection; and causing the computer to derive predicted values of speed of communication with a plurality of the terminal devices to be call targets at the time of a call connection establishment;

wherein the derived communication band required for the call connection with each of the terminal devices is derived based on based on the wired communication band and the derived predicted value of the speed of communication, using an equation: Band occupying rate=control band+(wired communication band/wireless communication speed)×constant.

* * * * *